(12) United States Patent
Schneider et al.

(10) Patent No.: US 8,043,754 B2
(45) Date of Patent: Oct. 25, 2011

(54) FAST LOCALLY RESOLVED ELECTROCHEMICAL IMPEDANCE SPECTROSCOPY IN POLYMER ELECTROLYTE FUEL CELLS

(75) Inventors: Ingo Schneider, Turgi (CH); Guenther G. Scherer, Haegglingen (CH)

(73) Assignee: Paul Scherrer Institut, Villigen PSI (CH)

( * ) Notice: Subject to any disclaimer, the term of this patent is extended or adjusted under 35 U.S.C. 154(b) by 901 days.

(21) Appl. No.: 11/884,070

(22) PCT Filed: Dec. 3, 2005

(86) PCT No.: PCT/EP2005/012952
§ 371 (c)(1),
(2), (4) Date: Mar. 5, 2008

(87) PCT Pub. No.: WO2006/087022
PCT Pub. Date: Aug. 24, 2006

(65) Prior Publication Data
US 2008/0318089 A1    Dec. 25, 2008

(30) Foreign Application Priority Data

Feb. 15, 2005 (EP) .................................. 05003167
Jul. 12, 2005 (EP) .................................. 05015055

(51) Int. Cl.
*H01M 8/10* (2006.01)
*H01M 8/04* (2006.01)
*H01M 4/64* (2006.01)

(52) U.S. Cl. .................... 429/430; 429/483; 429/522

(58) Field of Classification Search .................. 429/429, 429/430, 431, 442, 444, 483, 522; 506/7; 702/76
See application file for complete search history.

(56) References Cited

U.S. PATENT DOCUMENTS

| 6,214,487 B1 * | 4/2001 | Kelley et al. ............ 429/430 |
| 2003/0065461 A1 * | 4/2003 | Yoon et al. ............ 702/76 |
| 2004/0224204 A1 | 11/2004 | Smotkin et al. |

FOREIGN PATENT DOCUMENTS

DE    102 13 478 A1    12/2003

OTHER PUBLICATIONS

Cleghorn et al., "A printed circuit board approach to measuring current distribution in a fuel cell", Journal of Applied Electrochemistry, 28, 1998, pp. 663-672, XP000854421.

(Continued)

*Primary Examiner* — Jonathan Crepeau
*Assistant Examiner* — Kenneth Douyette
(74) *Attorney, Agent, or Firm* — Laurence A. Greenberg; Werner H. Stemer; Ralph E. Locher

(57) ABSTRACT

A fuel cell, such as a polymer electrolyte fuel cell, includes an anode reactant supply plate, an anode current collector, a cathode reactant supply plate, and a cathode current collector. At least one of the anode reactant supply plate, the cathode reactant supply plate, the anode current collector and the cathode current collector is electrically separated into a number of segments, wherein each segment of at least a subgroup of segments is separately connected to an electronic drive and analysis circuitry which performs in parallel impedance measurement in a frequency range of 0.1 mHz to 50 kHz of the respective segments.

12 Claims, 15 Drawing Sheets

OTHER PUBLICATIONS

European Office Action dated Feb. 4, 2011.
Bender et al.; "Further Refinements in the Segmented Cell Approach to Diagnosing Performance in Polymer Electrolyte Fuel Cells"; Journal of Power Sources, Elsevier Sequoia S.A. Lausanne, Switzerland vol. 123, No. 2; Sep. 20, 2003; pp. 163-171; XP004443559; ISSN: 0379-7753.
Wieser et al.; "A New Technique for Two-Dimensional Current Distribution Measurements in Electrochemical Cells"; Journal of Applied Electrochemistry, Chapman and Hall, London, GB vol. 30, No. 7; Jul. 2000; pp. 803-807; XP002170127; ISSN: 0021-891X.
Derwent Abstract—DE-102 13 478 A1; Dec. 24, 2003; Ralf Kraume, D-19061 Schwerin, Germany.

* cited by examiner 3-fold serpentine flow field

Graphite Block

1. Sawing Grooves

2. Epoxy Resin

3. Milling

4. Machining Flowfield

FIG 5
| FIG 5A | FIG 5B |
FIG 5A
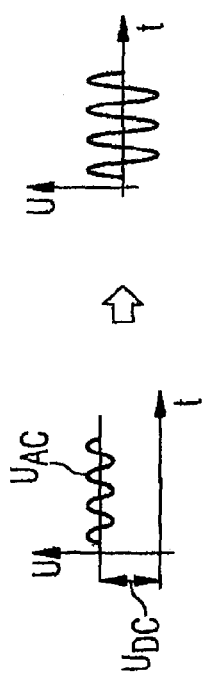
Measurement of Segment Voltage:
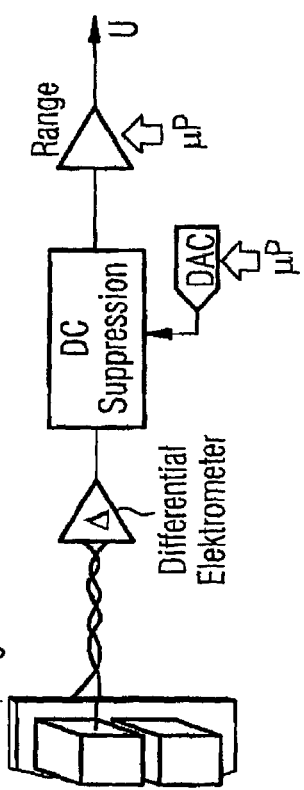
Differential Elektrometer
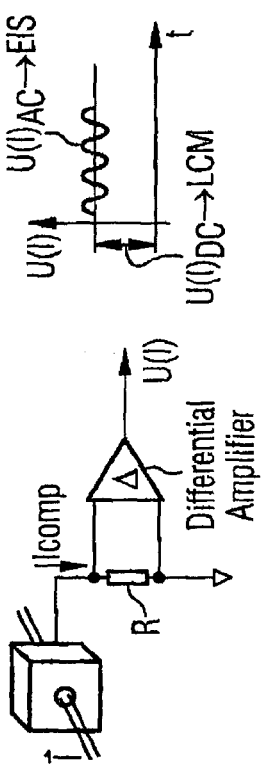
Measurement of Segment Current:
Differential Amplifier Local Impedance Spectra of PEFC

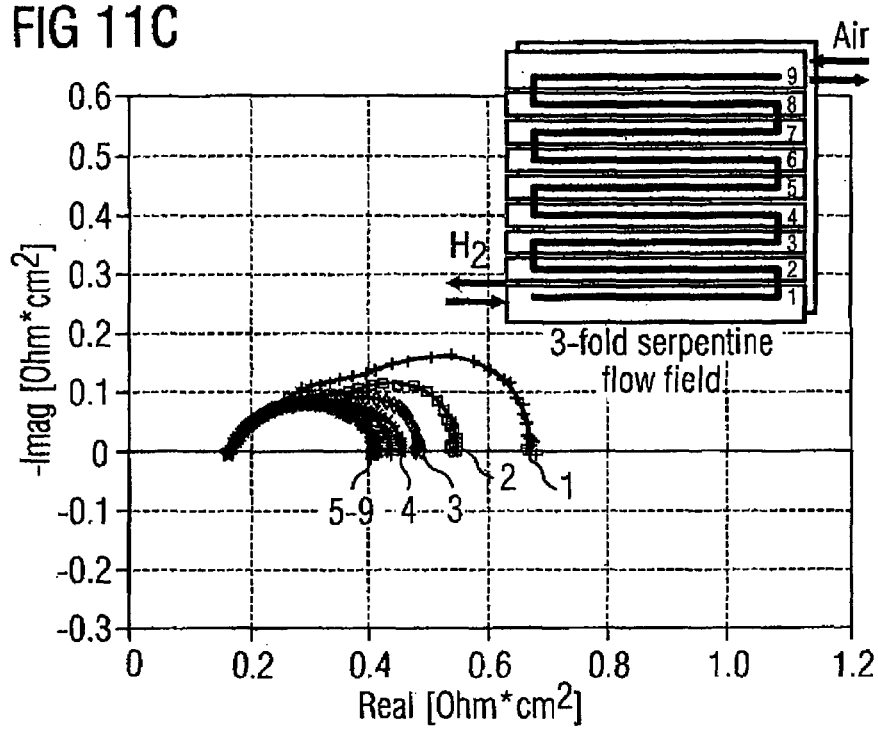
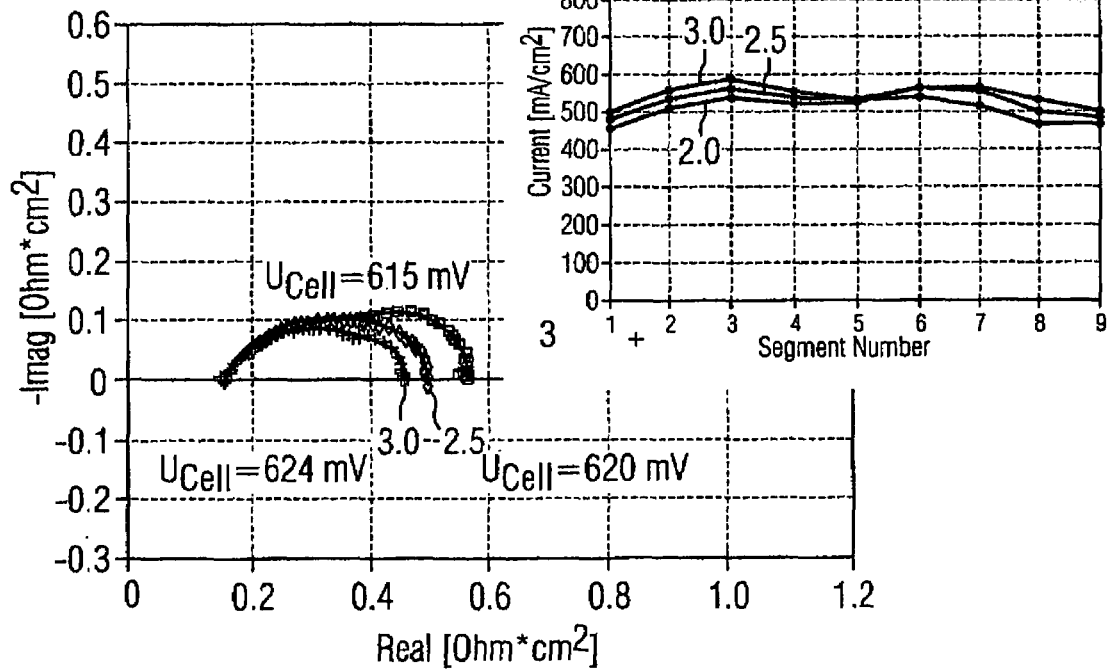

FAST LOCALLY RESOLVED ELECTROCHEMICAL IMPEDANCE SPECTROSCOPY IN POLYMER ELECTROLYTE FUEL CELLS

BACKGROUND OF THE INVENTION

The present invention relates to a fuel cell, such as a polymer electrolyte fuel cell, comprising an anode reactant supply plate and anode current collector and a cathode reactant supply plate and a cathode current collector. Further, the present invention relates to a method for determining the operational status of a fuel cell, such as a polymer electrolyte fuel cell, as given above.

The overall performance of a polymer electrolyte fuel cell (PEFC) depends on several factors: i) operating conditions, e.g. gas stoichiometry, temperature, humidification, operating pressure; ii) applied materials, e.g. type of membrane, catalysts, gas diffusion media (GDL) and iii) cell design, e.g. flow field design and orientation of the cell. Unfortunately, there is only limited insight into the influence of these factors, if an opinion is formed only by the measurement of the overall cell performance or by the application of diagnostic tools, like impedance spectroscopy (EIS) to the entire cell, since the active electrode area of PEFCs can exceed values of several tens of square centimetres for laboratory cells or even several hundreds of square centimetres for cells of technical scale.

Inhomogeneities in the local operating conditions due to variations in relative humidity, reactant concentration, temperature gradients, edge and mass transport effects or even manufacturing inconsistencies are highly likely to occur. This results in non-uniform performance over the active area.

When measuring over the entire active area of a PEFC, only average properties of cell parameters like current density or cell impedance can be determined. Thus, it is neither possible to identify inhomogeneities in fuel cell performance nor to get reliable information about limiting processes affecting the cell performance. Measurements performed over the entire active area of a PEFC are only meaningful if the local operating conditions are virtually homogenous throughout the cell, e.g. when using so called 1-dimensional cells.

Thus, improved diagnostic methods for PEFCs are badly needed not only for measuring but particularly for explaining inhomogeneities in cell performance. The application of these methods to an operating PEFC may provide more reliable and more meaningful data about the impact of factors like operating conditions or cell design on cell performance and the respective limiting processes.

To cope with this challenge, locally resolved current measurements in PEFCs may highlight inhomogeneities in the current distribution. However, by the application of locally resolved current measurements local inhomogeneities in the performance of PEFCs can only be identified but not explained. More advanced locally resolved diagnostic methods are needed to get information about the respective locally limiting processes and to gain a deeper understanding how operational parameters influence cell performance.

It is already known that there are three main processes limiting the performance of a PEFC, i.e. charge transfer, diffusion and ohmic resistance. The influence of these parameters on cell performance is highly dependent on the local operating conditions.

In principle Electrochemical Impedance Spectroscopy (EIS) can provide values for membrane resistance and charge transfer resistance as well as information about mass transport limitations. EIS is a powerful tool for in situ diagnostics in polymer electrolyte fuel cells. Thus, impedance spectroscopy has been applied to the entire cell before to get more insight about processes limiting cell performance.

But the information achieved by measuring the impedance spectrum of the entire cell is rather poor, since current density distribution measurements in PEFCs clearly show that inhomogeneities in local cell performance and thus in local cell impedance are highly likely to occur.

The main barrier to apply impedance spectroscopy in PEFCs in a locally resolved approach is measurement time. Time is a critical factor in EIS, since the cell can drift or a sudden change in the state of the cell can occur, i.e. at a given cell current (galvanostatic mode) or a given cell voltage (potentiostatic mode) the current density distribution can change. Depending on the frequency range the measurement of only one impedance spectrum can consume around half an hour of time which is not acceptable since the state of the cell can drift.

No local impedance measurements in realistic PEFCs of technical relevance and under realistic operating conditions have been reported so far.

SUMMARY OF THE INVENTION

It is therefore an objective of the present invention to provide a fuel cell and a method for determining the operational status of a fuel cell which establishes these determinations within or better than the time resolution as compared to the range of typical cell drift periods.

This aim can be achieved according to the present invention by a fuel cell, such as a polymer electrolyte fuel cell, comprising:

an anode reactant supply plate and anode current collector and a cathode reactant supply plate and a cathode current collector, thereby at least one of the two current collectors is electrically separated into a number of segments, each segment of at least a subgroup of segments being separately connected to an electronic drive and analysis circuitry which performs in parallel impedance measurements in a frequency range of 0.1 mHz to 50 kHz of the respective segments.

Further, this aim can be also achieved according to the present invention by a fuel cell, such as a polymer electrolyte fuel cell, comprising:

an anode reactant supply plate and anode current collector and a cathode reactant supply plate and cathode current collector, thereby the anode reactant supply plate and/or the cathode reactant supply plate is electrically separated into a number of segments, each segment of at least a subgroup of segments being separately connected to an electronic drive and analysis circuitry which performs in parallel impedance measurement in a frequency range of 0.1 mHz to 50 kHz of the respective segment.

Furthermore, this aim is achieved with respect to the method and with respect to the present invention by a method for determining the operational status of a fuel cell, such as a polymer electrolyte fuel cell, comprising an anode reactant supply plate and anode current collector and a cathode reactant supply plate and a cathode current collector, said method comprising the steps of:

a) separating electrically at least one of the current collectors and/or separating electrically the anode reactant supply plate and/or the cathode reactant supply plate into a number of segments;

b) connecting each segment of at least a selectable subgroup of segments separately to an electronic drive and analysis circuitry; and c) performing in parallel an impedance measurement in a frequency range of 0.1 mHz to 50 kHz for the respective segments and determining the impedance spectrum for each of the respective segments; and d) determining the operational status of the fuel cell in dependency of the determined impedance spectra.

With this unique parallel approach for locally resolved EIS in PEFCS, the recording time to obtain a locally resolved EIS spectrum is dramatically reduced and becomes comparable to the time required to obtain an integral EIS spectrum. The duration of a measurement is virtually independent on the spatial resolution, i.e. on the number of segments used in a segmented PEFC. This fuel cell concept allows to operate for example a 29.2 cm$^2$ PEFC with serpentine flow field. Due to the open architecture of the present system the setup can be easily matched to larger cells of all technical sizes.

The system for performing fast locally resolved EIS in PEFCs described here, was developed and built up at Paul Scherrer Institute, CH-5232 Villigen PSI, Switzerland. In a current embodiment the system is able to handle cell currents of up to 100 A and modulation frequencies from 0.1 microhertz up to 50 kHz, but these capabilities can be easily expanded.

With the present unique approach, the impedance measurement is performed for all segments of a segmented PEFC in parallel, resulting in a radical reduction in the overall measurement time needed for obtaining a locally resolved impedance spectrum.

A suitable separation of the reactant supply plate and/or the current collector can be achieved by forming the segments as rows. This architecture very often matches exactly the way the fluid channels are provided. Therefore, the strip-like design allows to determine the specific cell impedance along the flow path of the reactant and/or the product water, thereby the flow path usually has a serpentine design (meander design) for the flow paths. For that reason, it is possible to measure the variation of current density and impedance with changing reactant and water concentration along the flow paths (gas channels).

In order to detect the ac current in the respective segments by means having a low series impedance over the frequency range in question, the electronic drive and analysis circuitry may comprise a current follower circuit in order to produce a segment specific ac voltage output proportional to the ac current in the respective segment. Alternatively or additionally also, the electronic drive and analysis circuitry may comprise a Hall effect sensor circuit in order to produce a segment specific ac voltage output proportional to the ac current in the respective segment. The Hall effect sensor is a preferred sensor due to its high bandwidth of operation.

In order to avoid negative impacts caused by series impedances the electronic drive and analysis circuitry may detect both the segment specific voltage and segment current output simultaneously for at least a subgroup of the number of segments.

For the determination of the fuel cell status, in particular of the respective fuel cell segment, the electronic drive and analysis circuitry may detect the segment specific voltage and current output at a sample frequency in the range of 1 mHz to 10 MHz, whereas the sampled signals are used for spectrum analysis. Thereby, the segment specific voltage and the voltage proportional to the segment specific current are simultaneously digitized. For locally resolved impedance measurements in the frequency domain the digitized signals are transferred for each modulation frequency from the time domain into the frequency domain by Discrete Fourier Transformation (DFT). Using the calculated dc portion the distribution of the current density can be determined. Using the calculated amplitude relationship and the calculated phase shift between the segment specific voltage and the segment specific current the present impedance of the segments and therefore of the fuel cell can be determined.

In order to simplify the arrangement, the electronic drive and analysis circuitry may comprise an electronic load to control the integral fuel cell current; said load being adjustable in the range up to 1000 A. Therefore, only one electronic load has to be used, further allowing to control both the ac and the dc portion of the fuel cell current and the fuel cell voltage resp. Alternatively, the electronic drive and analysis circuitry may comprise a multichannel potentiostat to control the voltage of the segments; said voltage being adjustable in the range from 0 V up to 2 V.

Suitable measurement set-ups may use an electronic drive and analysis circuitry comprising an AC generator charging the impedance measurement circuit with AC signals in the range from 0.1 mHz to 50 kHz.

BRIEF DESCRIPTION OF THE SEVERAL VIEWS OF THE DRAWINGS

Preferred examples of the present invention are described hereinafter taking also reference to the following drawing which depicts in.

DETAILED DESCRIPTION OF THE INVENTION

Figure 1:
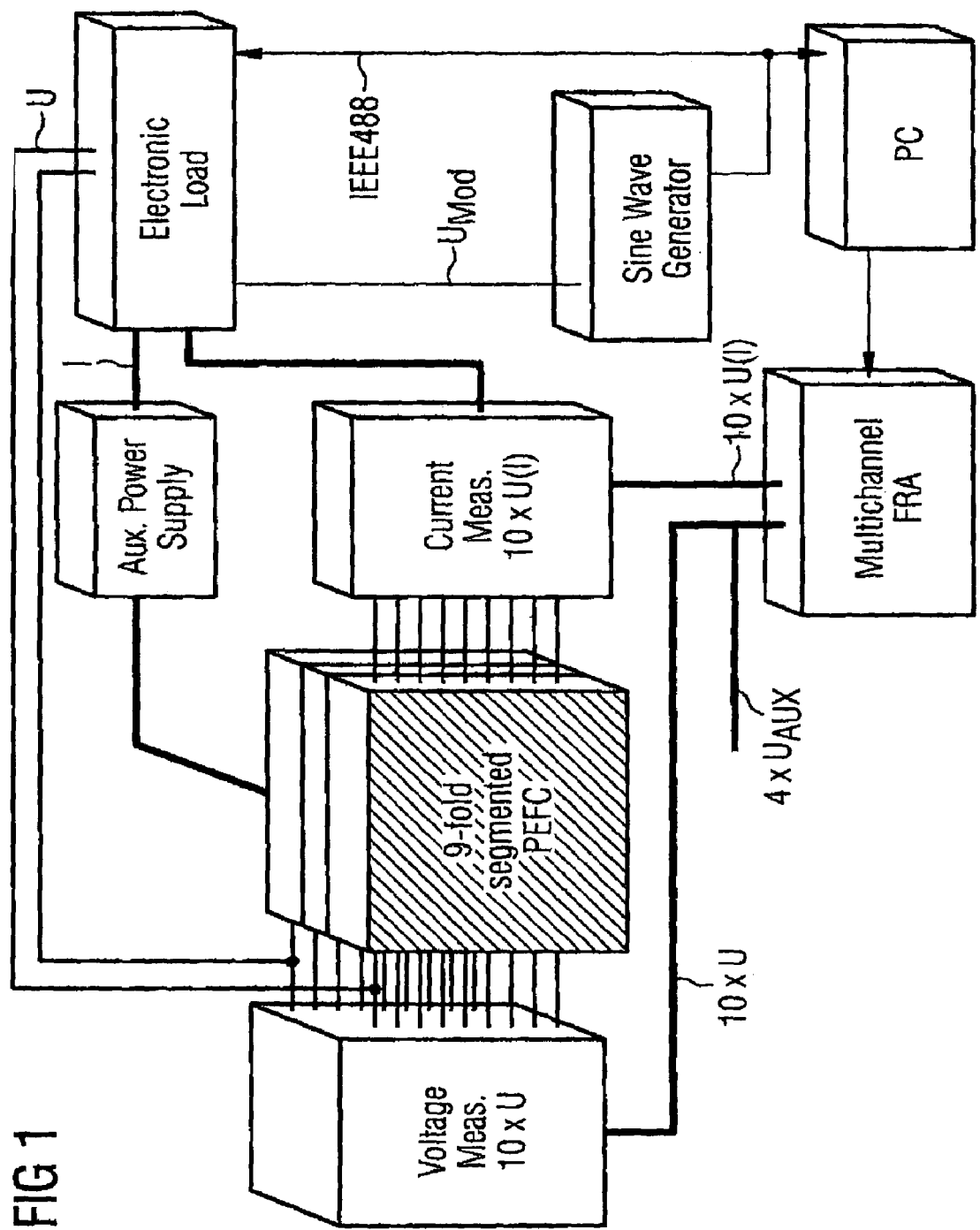
FIG. 1 a block diagram of the system for fast parallel EIS in PEFCs, employing a 9-fold segmented cell.

The system for performing locally resolved impedance spectroscopy is shown in a simplified block diagram in FIG. 1. Each segmented cell is connected to an electronic load in series with an auxiliary power supply. The electronic load controls the dc and the ac current of the PEFC. The modulation amplitude and frequency is determined by a programmable sine wave generator. The electric load, the auxiliary power supply and the programmable sine wave generator form part of the electronic drive and analysis circuitry. The segment currents and segment voltages are measured simultaneously. For the locally resolved impedance measurement to be performed the analog current and voltage signals are fed to a multichannel frequency response analyzer. The system is controlled by a personal computer comprising special software as explained below.

Segmented Cell

Figure 2:
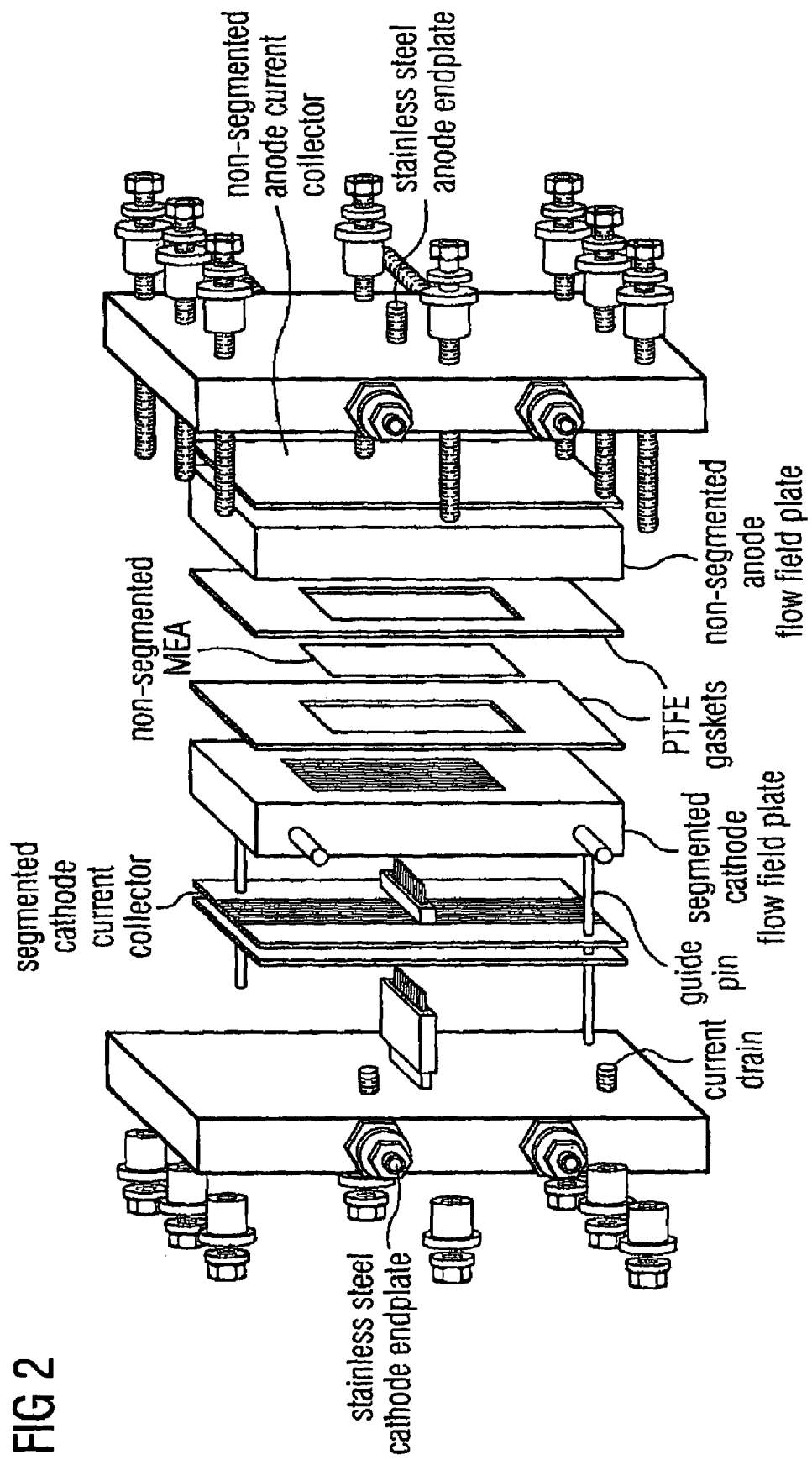
FIG. 2 a segmented 29.2 cm$^2$ PEFC employed for the locally resolved EIS measurements.
Figure 3A:
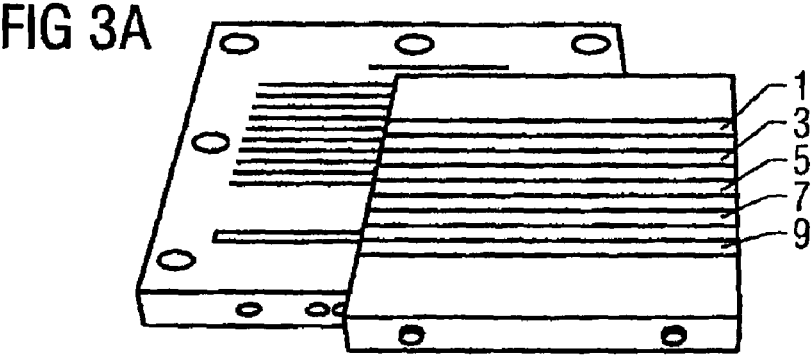
FIG. 3 a) a segmented cathode flow field plate, gold plated segmented current collector and stainless steel endplate, b) schematic of segmented flow field and numbering of segments, and c) manufacturing steps for segmented flow field plate.
Figure 3B:
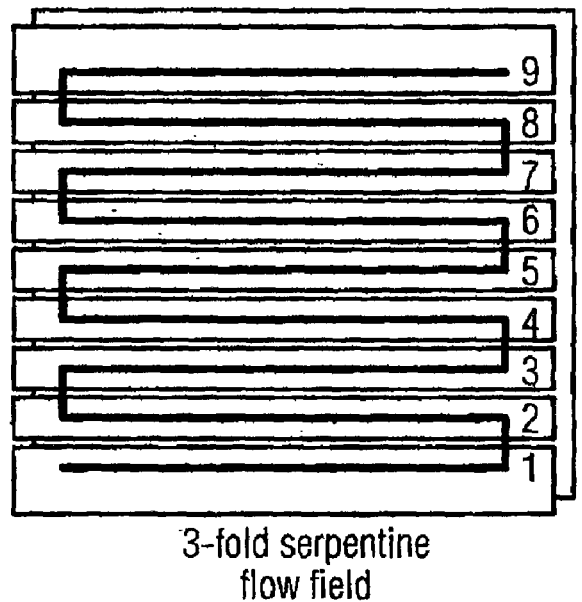
Figure 3C:
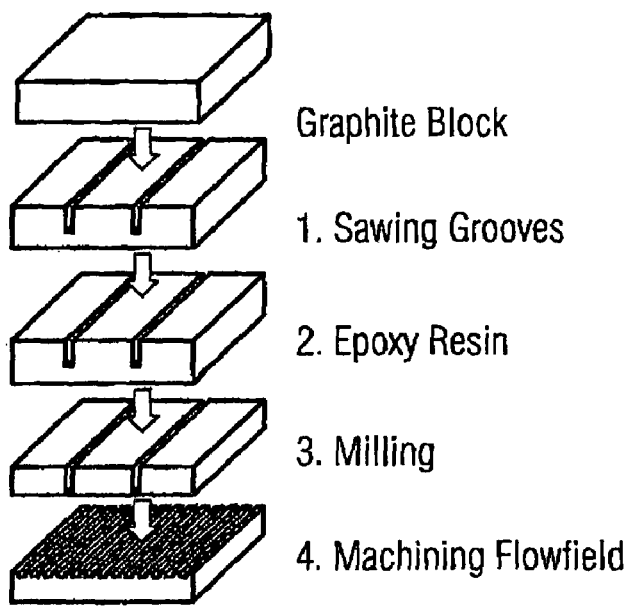

The segmented cell (area 29.2 cm$^2$) shown in FIG. 2 is similar to an ordinary filter-press type H$_2$/O$_2$-PEFC consisting of a membrane electrode assembly (MEA) sandwiched between two 3-fold serpentine flow field plates, which are clamped together by outer stainless steel end plates. The only exception is the cathode flow field plate and its gold plated current collector. Both are divided into 11 electrically isolated segments (FIG. 3*a*), i.e. the cathode flow field is 9-fold segmented. Since the cell is segmented along the gas channels (FIG. 3*b*), it is possible to measure the variation of current density and impedance with changing reactant and water concentration along the gas channels. The manufacturing process of the segmented cathode flow field plate is schematically shown in FIG. 3*c*. Nine grooves of 0.4 mm width and 16 mm depth are sawed into a compact graphite block (Diabon NS 2, SGL Carbon Group, Meitingen, Germany) of 20 mm thickness. The graphite block is then heated up to a temperature of 110° C. and the grooves are filled with a low viscosity epoxy resin at this temperature. The curing is done at 100° C. for 4 h. After curing of the resin the remaining compact part of the graphite is milled away, resulting in a segmented graphite plate with an overall thickness of 15 mm and outer dimensions of 100 mm×100 mm.

Both sides of the segmented graphite plate are polished. This is of prime importance to minimize contact resistances between the segments of the graphite plate and the cathode current collector. After this the 3-fold serpentine flow field with a channel width of 1 mm (channel to land ratio 1:1) and a channel depth of 0.5 mm is machined along the segments. Each segment is equipped with a socket for voltage and temperature measurement.

Two guide pillars made from PEEK (Polyetheretherketone) are used to enforce the compression strength of the segmented plate. The anode flow field plate is of identical type with the exception of segmentation using the same flow field pattern. A non segmented gold plated copper plate serves as the anode current collector (FIG. 2).

The segmented current collector consists of a fiber-glass reinforced epoxy plate and 11 gold plated copper plates which are sticked on this plate (FIG. 2). The gold plated copper plates are electrically isolated of each other. Each of the inner 9 plates collects the current of one active segment, whereas the outer two larger plates exclusively serve as spacer between the epoxy plate and graphite flow field plate, but do not carry any current (FIGS. 2, 3). The inner nine segments are equipped with a drill to screw on the current collector to the current drain. The current drain is made of 9 gold plated copper rods inserted into an insulator. The copper rods are equipped with a thread on each top for connecting the cathode current collector on the one and the current measuring circuitry on the other side. The endplates are equipped with cut-outs for taking up the insulator.

All parts of the cell are assembled by using guide pins. The MEA is sandwiched between the non-segmented anode and the segmented cathode flow field plate (FIG. 2). The gas diffusion layer (GDL) of the MEA is not segmented, so lateral currents across the GDL are allowed to occur as it happens in non segmented PEFCS, too. However, potential differences between the segments have to be kept as low as possible to minimize lateral currents through the GDL. Special arrangements can be made for this problem as described below.

Figure 4A:
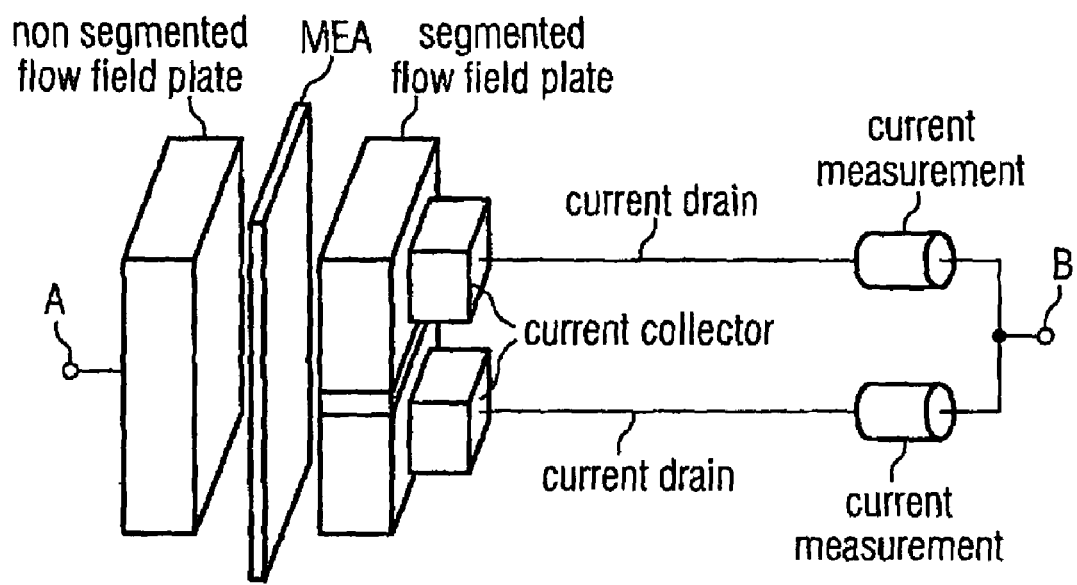
FIG. 4 a) a schematic representation of a two-fold segmented PEFC with current measuring circuitry and b) equivalent circuit, U: sub-cell with impedance $Z_i$, $Z_{CCG}$: impedance of the contact between current collector plate and graphite segment, $Z_{CC}$: impedance of the current collector plate, $Z_{CD}$: impedance of current drain, $Z_{CM}$: impedance of current measuring circuit.
Figure 4B:
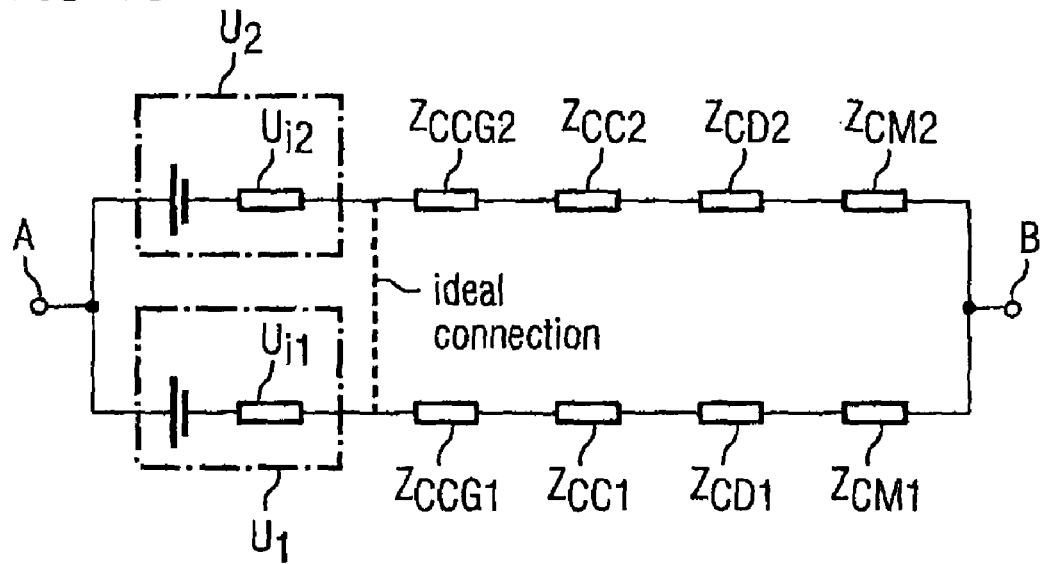

The basic requirement for an impedance measurement to be performed properly is the accurate measurement of the voltage and the respective current signals. Furthermore, connecting the voltage and current measuring circuits to the cell should not have any impact on the measured parameters themselves. In principle, a segmented PEFC is a parallel circuit of individual sub-cells as shown schematically for a two-fold segmented cell in FIG. 4*a*. However, these sub-cells, represented as voltage sources U$_1$, U$_2$ in the equivalent circuit (FIG. 4*b*) are not ideally connected as it would be the case in a non segmented cell. In series to each sub-cell is the impedance of the current collector plate Z$_{CC}$, the impedance of the contact between current collector plate and graphite segment Z$_{CCG}$, the impedance of the current drain Z$_{CD}$ and the impedance of the current measuring circuitry Z$_{CM}$. Due to these series impedances the segment voltages can be different in phase and amplitude when operating the cell in galvanostatic mode. In this parallel circuit the voltage is equal in phase and amplitude only between point A and B. Thus for the locally resolved impedance measurement to be performed properly it is desirable to measure all segment voltages individually. Since the current is constant in phase and amplitude in each branch of the parallel circuit, each segment impedance can be calculated from the respective ac segment voltage and the respective ac branch current.

Wide bandwidth differential electrometers are used for the measurement of the segment voltages. The segments are connected to these amplifiers by using twisted pair wires. The small offset voltages of the amplifiers are estimated with the inputs being connected to ground. The result of the calibration measurement can be stored to correct for dc errors in segment voltages. Due to the high input impedance of the differential electrometers, the cell operation is not influenced by connecting these amplifiers to the segments.

However, any series resistance to $U_x$ (x=1, 2) has an impact on the current density distribution, even if all series resistances are of equal size. Differences in the segment currents lead to potential differences between the segments and lateral currents across the gas diffusion layer can result. The only way to circumvent this problem is an ideal individual potentiostatic control of each segment voltage. The potentiostatic control circuit compensates for any voltage drop between $B_x'$ (x=1, 2) and B. However, this approach is costly and furthermore, commercial multichannel potentiostats are not ideal, errors in the regulated cell voltage can occur. Even more, galvanostatic operation of a fuel cell is more realistic than potentiostatic operation.

Considering these drawbacks it is reasonable to operate the segmented cell in galvanostatic mode accepting small differences in voltage between two adjacent segments. In galvanostatic operation mode only one electronic load is necessary to control the ac and the dc current of the segmented PEFC. Even potentiostatic control is possible with employing only one load and might be advantageous when performing impedance measurements near the limiting current region. In this operation mode the voltage of only one segment is controlled, i.e. the load keeps the cell current at a level where the branch current through this segment is adequate to keep the segment voltage constant.

However, in this approach all resistances between $B_x'$ (x=1, 2) and B (FIG. 4) have to be minimized to a level near zero. Especially the measurement of the segment currents becomes challenging in this context, since employing current measuring resistors for this purpose is highly unfavorable.

A zero resistance ammeter (ZRA) is needed for this task, i.e. a current to voltage converter that produces a voltage output proportional to the current flowing to the input terminals while imposing a 'zero' voltage drop to the external circuit. Two possibilities to realize the ZRA circuits for the measurement of the segment currents are considered.

The first one is the application of current follower circuits. One current follower has to be built up for each segment. With this approach the potential of the segments is kept constant, i.e. it is kept at "virtual ground" with the anode segmented. In an ideal circuit, no voltage gradients between the segments can occur. However, this technique is rather complex since amplifiers are employed and each current follower has to drive the whole segment current. So this approach is more sophisticated for cells of technical scale exhibiting cell areas of several hundreds of square centimetres. Even with the segmented laboratory cell the segment currents can easily reach values of several Amps. Furthermore, due to the large dimension of the circuits it is difficult to connect the current followers directly to the drain of the current collector. Since wires are needed for this purpose, this will again increase the impedance between B and $B_x'$ (x=1,2).

The second solution to realize an ZRA is the utilization of Hall effect current sensors. Hall effect current sensors measure the magnetic field strength in close proximity to the current conductor. A magnetic field passing through a semiconductor resistor will generate a differential voltage proportional to the field, i.e. in theory no additional voltage drop will occur due to the measurement of the segment currents. There are two techniques for sensing current using Hall effect devices.

In an open loop topology, the Hall element output is simply amplified and the output is read as a voltage that represents the measured current by a scaling factor. In order to induce a larger signal out of the Hall element, the current conductor may be wrapped around a slotted ferrous toroid. In a closed loop topology, the output of the Hall element drives a secondary coil that will generate a magnetic field to cancel the primary current field. The secondary current, scaled proportional to the primary current by the secondary coil ratio, can then be measured as voltage across a sense resistor. By keeping the resultant field at zero, the errors associated with open loop sensors, i.e. offset drift, sensitivity drift and saturation of the magnetic core will be effectively cancelled. Closed-loop Hall effect current sensors do not only provide excellent accuracy but particularly provide the fast response time and wide bandwidth needed for performing impedance measurements in PEFCs. Currently, sensors of LEM Switzerland (LAH 25-NP) were used, the design of these devices internalizes the current carrying conductor, i.e. the sensor has to be connected in series to the current drain of a segment and introduces a small series impedance. The impedance of the sensor is very small and depends on the selected conversion ratio (180 µΩ, 12 nH @ 1:1000 and 810 µΩ, 54 nH @ 2:1000). For the impedance measurements shown here a conversion ratio of 2:1000 was chosen. In this configuration the overall series resistance between $B_x'$ (x=1, 2) and B is around 1.5 mΩ including all contact and wire resistances. The measuring resistance for the secondary current was chosen for a sensitivity of 0.7 V/A and a maximum segment current of 7 A, limited by the input range of the data acquisition system. Even when strong current gradients in the cell occur (e.g. $H_2/O_2$-operation in co-flow mode under low humidity conditions) the difference in current between two adjacent segments will not exceed values of around 2 A, i.e. even under extreme conditions the maximum potential difference between two adjacent segments will not exceed a value around 3 mV.

The main advantage is the high flexibility of this approach using only one load and closed loop Hall sensors. The load and the current measuring circuitry can be easily adapted to larger cells keeping all the other components of the setup unchanged, since a variety of appropriate electronic load modules and closed loop Hall sensors are available. Since the impedance of the Hall sensors decreases with increasing current capability and decreasing sensitivity larger segment currents will not necessarily lead to a proportional higher voltage drop over the sensors.

Due to the compact dimensions of the Hall sensor circuits it is possible to mount them on a specially designed printed circuit board which is directly connected to the current drain of the current collector to keep the overall impedance of the current measuring circuit as low as possible. The cell is operated at temperatures around 80° C. and in principle, the sensors employed here can operate up to temperatures of 100° C. Due to the closed loop design the temperature drift of the sensors is low and small changes due to changing room temperature can be accepted. However, the dc and ac error slightly increase at elevated temperature. In order to avoid a calibration of the sensors as a function of temperature, they have been kept at room temperature by using a simple fan.

However, even at room temperature the bandwidth of the Hall sensors is limited (200 kHz @ −1 dB) which results in a small error of a few percent in measured impedance at higher frequencies, i.e. above 1 kHz. Locally resolved impedance measurements have been performed up to frequencies of 10 kHz, though the multi-channel FRA is able to handle modulation frequencies up to more than 60 kHz. Calibration was done for each individual channel by using a dummy cell made from nine low inductance resistors. The error in measured impedance introduced by the current sensors was measured as a function of frequency by using this dummy cell. Scaling functions were determined for each channel. Furthermore, the offset voltages of the Hall sensors are estimated with the cell being disconnected from the load. The result of the calibration measurement is stored to correct dc errors of each channel.

It was the aim to set up a system for performing locally resolved EIS in realistic PEFCs of different scale, i.e. in small laboratory cells and in cells of technical scale as well. So a high flexible system architecture was chosen employing only one electronic load for controlling the dc and the ac cell current of the cell. Segment currents up to 100 A have been measured by employing different types of closed loop Hall sensors in the current measuring circuitry. A variety of programmable wide bandwidth electronic loads is commercially available. The system can be easily customized for cells of different size by employing appropriate electronic loads and current sensors, while keeping the rest of the setup unchanged.

For the locally resolved EIS measurements shown here, we have been using a popular N3300A series load (N3304A Agilent Technologies) providing two current ranges of 6 A and 60 A. Load modules are available within this series with current capabilities up to 120 A and a bandwidth of 10 kHz @ −3 dB. The dc current of the load is programmed via IEEE488 interface, whereas the ac current is controlled via the external modulation input of the load. A programmable function generator (33220A Agilent Technologies), controlled via IEEE488 interface, is employed for providing the sinusoidal control voltage for the external modulation input.

However, due to the limited bandwidth of the load (10 kHz @ −3 dB) an attenuation of the modulation current at a given control voltage level occurs at higher frequencies. This does not have any effect on the impedance measurement to be performed properly, as long as the level of the ac signals is high enough to be measured. The voltage and current measurement is performed by the external circuits of the system and thus is independent from the characteristic of the respective electronic load. However, the amplitude of the function generator signal can be increased at higher frequencies, to keep the modulation current amplitude constant.

For both, data acquisition and frequency response analysis as well, a multichannel frequency response analyzer has been built up. This analyzer has ten voltage and ten current channels and performs the frequency response analysis at a given modulation frequency for up to nine segments and the entire cell in parallel. Furthermore, there are four secondary voltage channels to employ reference electrodes in segmented PEFCs. This unique parallel approach leads to a radical reduction in measurement time for obtaining the desired locally resolved impedance spectrum.

Figure 5B:
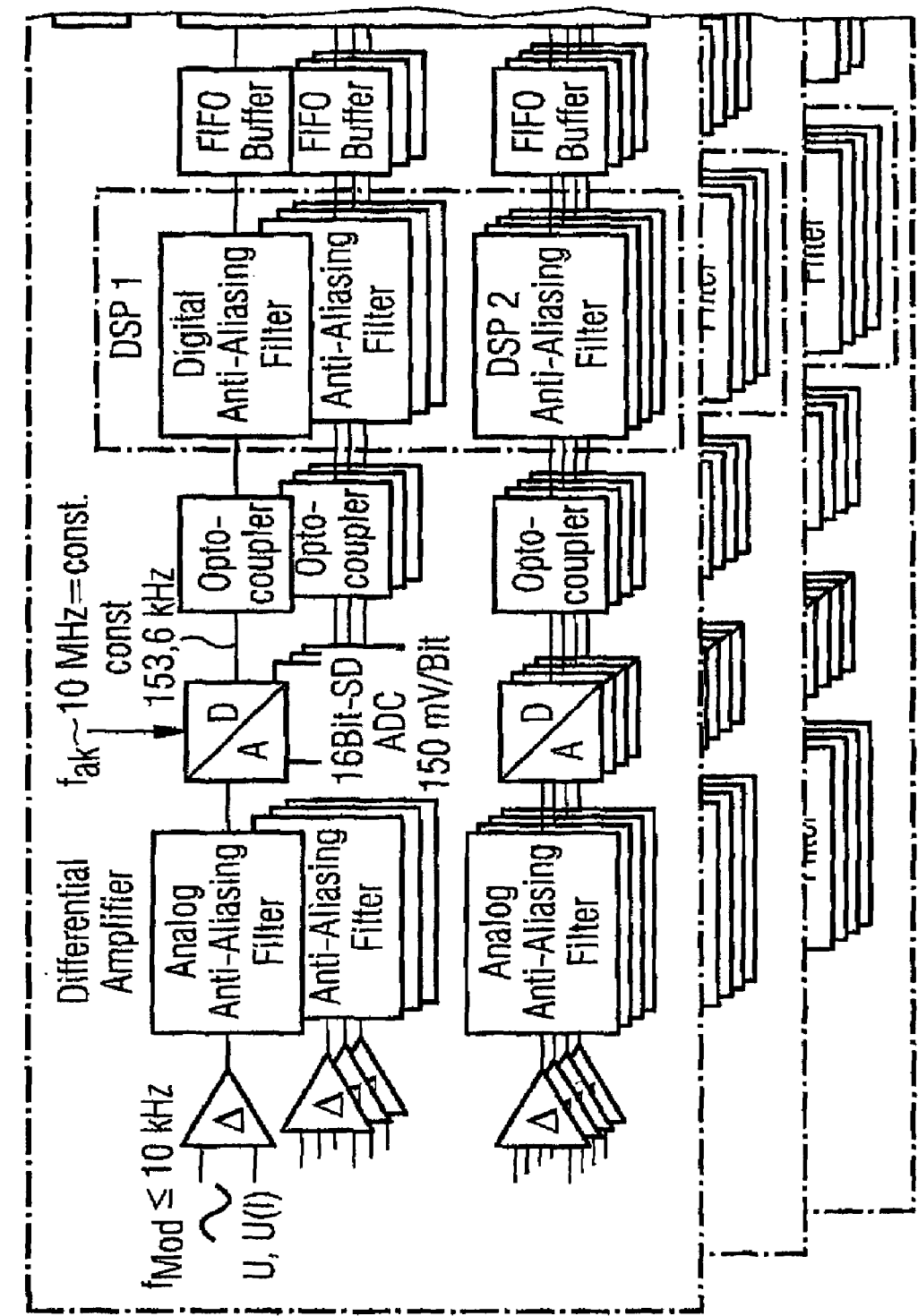
FIG. 5 a simplified block diagram of the multichannel frequency response analyzer and measurement of segment voltages and segment currents.

The architecture of the voltage and current channels is shown in FIG. 5 in a block diagram. During normal dc operation of the cell these channels are used for simultaneous sampling of the dc segment voltage and segment current signals up to a maximum sampling rate of approximately 150 kHz for each channel. Locally resolved transient analysis of PEFCs and fast pulse or step experiments or even locally resolved time domain EIS in PEFCs are possible with these high performance data acquisition channels.

When performing impedance spectroscopy the segment voltages and currents have a small ac and a large dc part. The small ac signals have to be amplified to provide a high resolution measurement of the cell impedance. For this purpose, the large dc parts of the signals have to be suppressed. A voltage equal to the dc signal but with inverse sign is added to the signal before amplification. This is done for the moment only for the voltage signals by using individual adder circuits for each voltage channel. Since all segment voltages have virtually the same dc part only one programmable voltage source is needed to provide the suppression signal. A high precision 12 bit digital-to-analog converter is employed for this purpose.

A dc voltage suppression circuit for the current channels is provided. For the time being the current channels provide sufficient resolution in this first approach for parallel EIS. The current channels have a fixed bipolar input range, whereas each voltage channel provides two switchable bipolar input ranges with different sensitivity.

The dc voltage of the cell is determined before the impedance measurement is performed without a dc suppression voltage applied as a mean value of all segment voltages by using the low sensitivity input range of the voltage channels. The impedance measurement is then performed by using the high sensitivity input range with the dc suppression voltage applied. Due to the limited resolution of the digital-to-analog converter and small differences in the segment voltages, there is always some misalignment between the actual dc voltage of a segment and the magnitude of the dc suppression signal. Thus the residue signal of a segment voltage, with the dc suppression voltage applied, always contains a small dc part. This dc part is determined by averaging the residue signal over an integral number of periods of the modulation signal. Due to the high precision of the digital-to-analog converters and the adder circuits the actual dc voltage of a segment can be calculated by the addition of the programmed dc suppression voltage and the dc part of the residue signal for each modulation frequency applied in a sweep, i.e. a drift of the cell voltage during the measurement of a spectrum will be detected. Even more, a drift of the segment currents during a frequency sweep, i.e. a change in the current density distribution can be detected. Therefore, the dc part of the current signals and thus the present current density distribution is determined for a given modulation frequency by averaging these signals over an integral number of periods of the sinusoidal modulation signal.

The current configuration provides 10 current and 14 voltage channels, but the system can be easily expanded. Each of the high performance data acquisition channels shown in FIG. 5 is equipped with a differential input stage to suppress common mode signals and fourth order analog anti-aliasing filters with fixed cut-off frequency. The signals are digitized in parallel by using 64× over-sampling sigma-delta analogue-to-digital converters. Thus, overall 24 analogue-to-digital converters are employed. All converters are clocked simultaneously with a fixed sampling rate of approximately 10 MHz. After decimation by 64 within the analogue-to-digital converters, the digitized signals are output in parallel with a resolution of 16 Bit at a constant rate of approximately 150 kHz. This sampling rate is too high to be applied at lower modulation frequencies. This would result in an inflationary number of data points within one period of the sinusoidal modulation signal. Thus, it can be necessary to decimate the number of data points, which then would result in a lower effective sampling rate.

The effective sampling rate is determined by the modulation frequency and the desired number of samples to be taken in one period of the sinusoidal modulation signal. Since lowering the sampling rate results in a lower effective Nyquist frequency, programmable digital low pass filters with extremely sharp cut-off characteristics are employed to attenuate spectral components above the effective Nyquist frequency before decimation. A digital signal processor (DSP) performs filtering and decimation of the data for each group of four channels, thus an overall number of six DSPs are employed for performing this task for all data channels. For frequency domain impedance measurements up to 10 kHz the cut-off frequency of the digital filters is chosen to be one tens of the effective sampling rate.

After decimation the data is transferred to a microprocessor via first in first out (FIFO) memories. One microprocessor is used for each group of 8 channels. The microprocessors store the data in a RAM and allow communication with a PC. For a given modulation frequency the data of a selectable number of periods is used for determining the impedance of the segments by using Discrete Fourier Transformation (DFT). This is done in several steps. First, the dc parts of the digital voltage and current signals are estimated and subtracted from the data, since large dc parts can cover the small ac signals in the spectrum. The ac data is multiplied with a window function. Several window functions are selectable for this purpose. For the impedance measurements shown here the Van Hann window function has been used. In a next step the windowed data is filled up with zeros to the desired number of points to be obtained in the spectrum. A large number of zeros decreases the inter frequency spacing of the fourier transformed data, i.e. the frequency and amplitude of the maxima in the spectra can be detected with higher precision. Each data set is then fed to a fast DFT algorithm to transform the data from time into frequency domain, i.e. to get the complex voltage and current as a function of frequency for all segments. All data points above the Nyquist frequency are discarded. From these spectra the amplitude spectra of the voltage and current signals are calculated. The peak amplitudes and peak frequencies in the voltage spectra are detected and even more, the peak values are determined in the spectra of the respective current signals for these given peak frequencies. The amplitude of the sinusoidal ac current and ac voltage signals are computed as 16 Bit values by dividing each peak value by the coherent gain of the window function and multiplication by two, since only one half of the signal energy is contained in the part of the spectra from dc to the Nyquist frequency. These numbers are converted to the respective ac voltage and ac current amplitudes taking into account the transfer function of the voltage and current channels.

The impedance for each segment at a given modulation frequency is determined as follows. The complex voltage and the complex current spectra are divided by each other. The modulus, phase, real and imaginary part of the impedance are determined at the respective peak frequency in the resulting impedance spectra, taking into account the transfer function of the voltage and current channels. The data set of each segment at a given modulation frequency is stored.

Furthermore, the data set of each segment is corrected for errors in modulus, phase, real and imaginary part by using the scaling functions of the calibration procedure. This procedure is done for each given frequency during the measurement, i.e. the spectrum can be displayed in real time.

Due to our unique parallel approach the duration of a measurement for obtaining a locally resolved impedance spectrum is comparable to the time required to obtain an integral impedance spectrum.

The software interface to operate the impedance system is shown in FIG. 6. The cell can be operated in constant current or constant voltage mode. In constant current mode the integral cell current is controlled by the electronic load, in constant voltage mode the voltage of any segment. During normal dc operation of the cell, i.e. when an impedance measurement is not performed, all segment voltages and all segment currents are displayed as numerical value, furthermore the active current density distribution and the segment currents vs. running time are displayed in real time. Though the hardware provides much faster acquisition rates up to approximately 150 kHz, not necessary for normal operation of the cell, these values are updated only every second. All values are stored in a log file.

The cell is kept in dc operation mode until the segment voltages and the segment currents become virtually unchanged, i.e. a steady state is reached. This is a precondition for the locally resolved impedance measurement to be performed properly. However, the impedance measurement can be started or cancelled any time in this mode.

The impedance measurement can be performed in constant voltage or constant current mode, the amplitude of the sinusoidal modulation voltage or the modulation current can be chosen. However, with the electronic load employed for the measurements described here galvanostatic ac operation is established. A frequency sweep is alternatively carried out in a linear or logarithmic sweep mode, i.e. with equally spaced measuring points on a linear or on a logarithmic scale. The respective frequency increment or the respective number of points per decade and furthermore the direction of the sweep can be chosen via the software. Even more settings like the number of sine waves to be taken into account for the frequency response analysis within a given frequency range or DFT settings like the window function or zero padding of the time domain data can be chosen. There are several other options included in the software, e.g. automatic detection of voltage reversal including automatic shutdown of the load and many more.

Figure 6A:
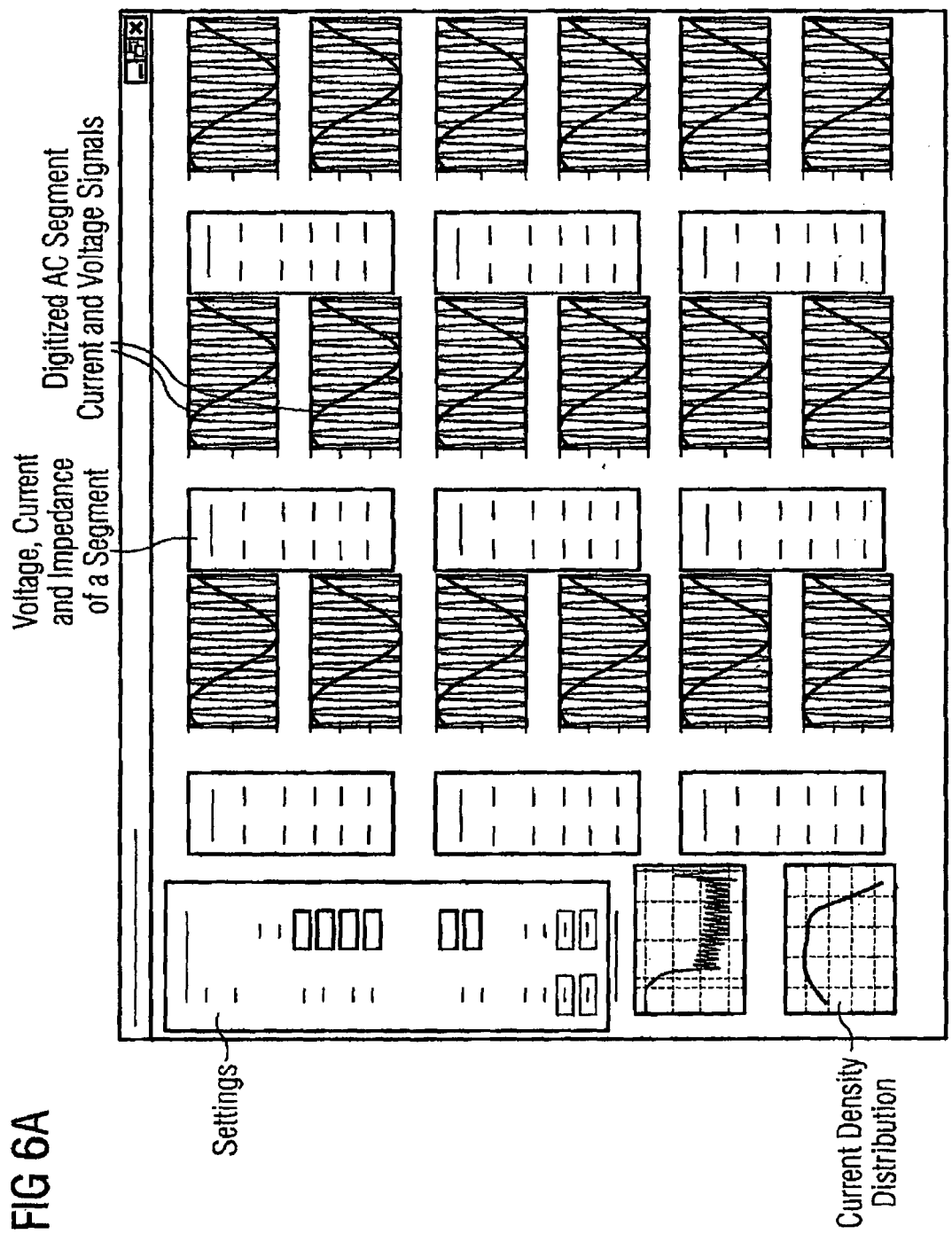
FIG. 6 a software interface for performing locally resolved EIS in PEFCs a) user interface b) Nyquist representation of segment impedance spectra in real time during the measurement.

During the impedance measurement the determined ac and dc values for voltage and current at a given frequency are displayed in real time and saved in a file for each segment. Thus, a drift of the segment voltages or the segment currents during the frequency sweep will be detected. Furthermore, the sampled sinusoidal ac voltage and current signals are displayed for each segment as a function of time to check the quality of the time domain signals, which are 'free' of noise if the cell performs stable (FIG. 6a). By this, even a drift at a given modulation frequency, i.e. during the impedance measurement, will not remain undiscovered.

Figure 6B:
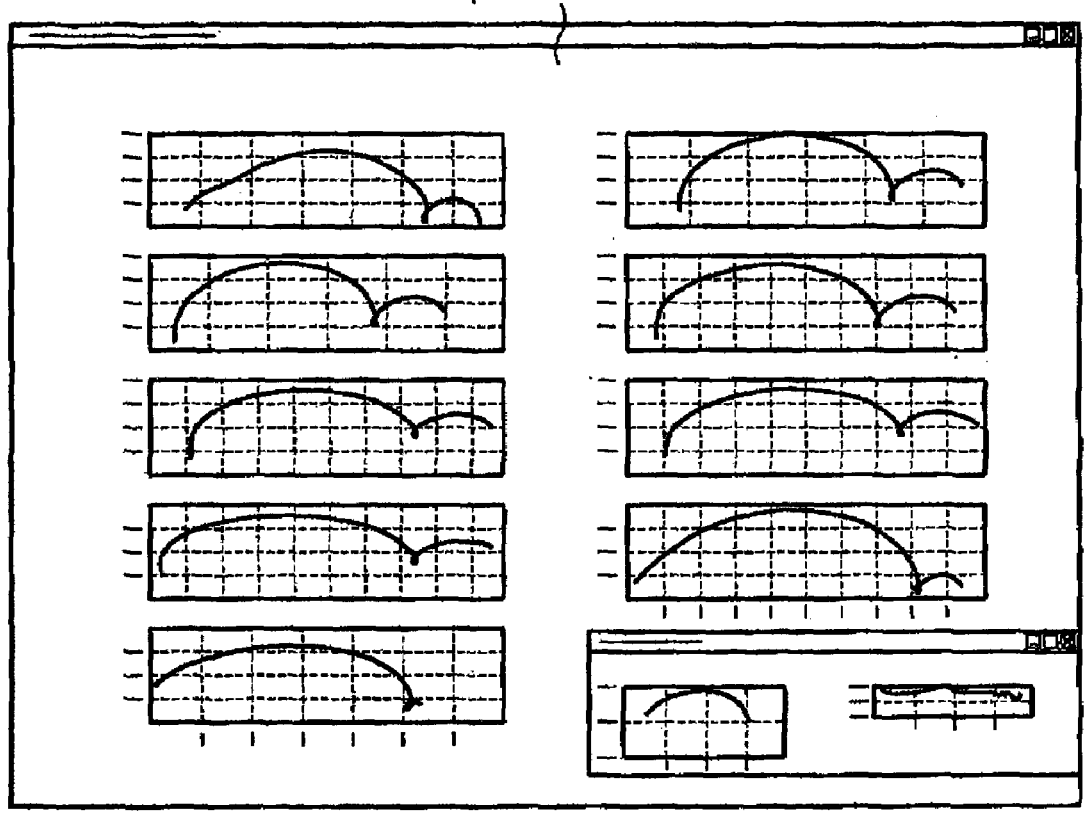

For a given modulation frequency the impedance for each segment is displayed in real time during the measurement as real and imaginary part or modulus and phase of the impedance. The impedance spectra of all segments and even more the current density distribution is displayed in real time during the measurement alternatively in Nyquist or Bode representation (FIG. 6b). Corrected or uncorrected data can be displayed. To check the quality of the DFT even more the determined peak frequencies are displayed.

Membrane electrode assemblies were prepared from Nafion 115 membranes and Toray paper based Pt/C electrodes with a platinum loading of 0.66 mg/cm$^2$. The MEA was hot pressed for 3 minutes at 50 kN and 120° C. PTFE gaskets, 200 µm thick, were used to seal the cell. The fuel cell was assembled with a torque of 4 Nm per bolt.

The cell was operated at ambient pressure in galvanostatic operation mode with $H_2/O_2$ and $H_2$/air as the reactant gases using a cell temperature of $T_{Cell}=70°$ C. The dc cell current was chosen to be $I_{Cell}=14$, 6 A. Under $H_2/O_2$ operation the gases were humidified at a temperature of $T_{hum.\ H2}=T_{hum.\ O2}=55°$ C. and fed to the cell in co-flow mode using a stoichiometry of $\lambda_{H2}=\lambda_{O2}=1.5$. The gases were fed to the cell by using heated pipes operated at a temperature of $T_{pipe\ H2}=T_{pipe\ O2}=70°$ C. For $H_2$/air operation the gases were fed in counter-flow mode using a stoichiometry of $\lambda_{H2}=1.5$ ($T_{hum.\ H2}=75°$ C., $T_{pipe\ H2}=80°$ C.) and air was fed using various stoichiometries of $\lambda_{O2}=2.0$, $\lambda_{O2}=2.5$ and $\lambda_{O2}=3.0$ ($T_{hum.\ O2}=70°$ C., $T_{pipe\ O2}=80°$ C.).

The locally resolved impedance measurements were started when the segment voltages and currents became virtually unchanged. The dc segment currents and voltages saved in a log file during the measurements were checked for a noteworthy drift and even more the quality of the displayed ac current and voltage signals was checked for each modulation frequency applied.

Figure 7A:
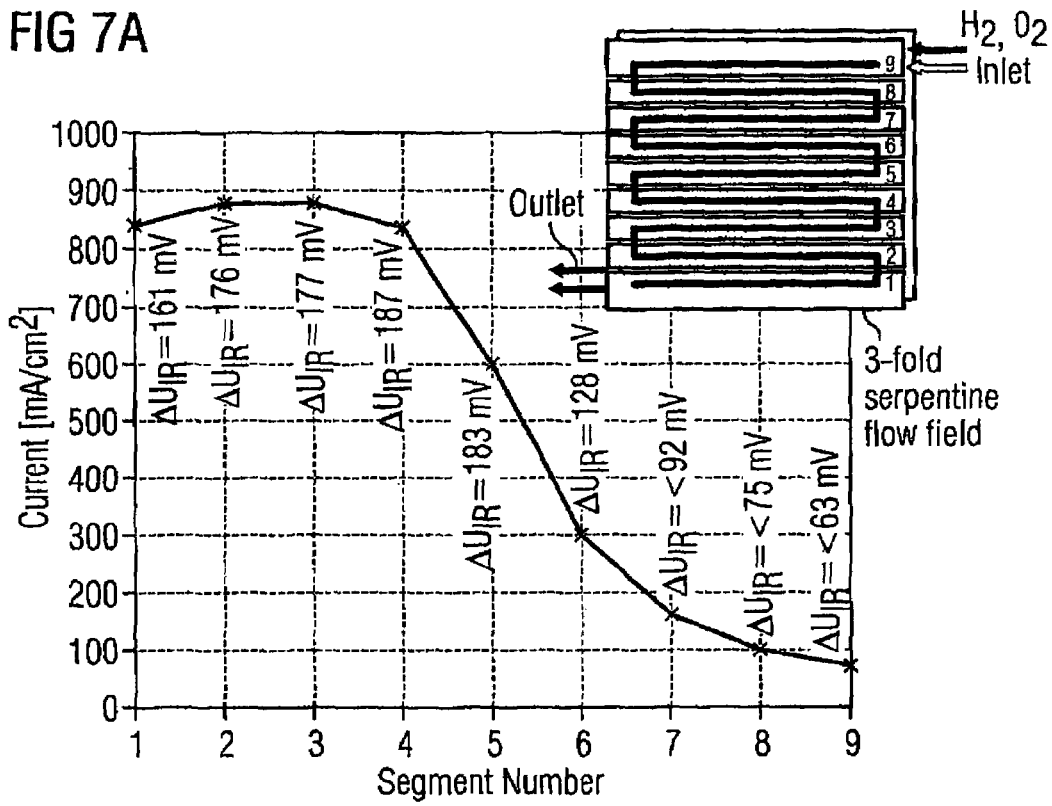
FIG. 7 a) a current density distribution curve and ohmic voltage drop $\Delta U_{IR}$, b) locally resolved impedance spectrum (segments 1 to 9), c) locally resolved impedance spectrum (segments 1 to 4) for $H_2/O_2$ operation of the PEFC. Operating conditions: cell current $I_{Cell}$=14.6 A, gas stoichiometry $\lambda$=1.5, modulation frequency range f=15 mHz to 10 kHz, cell voltage $U_{Cell}$=538 mV, numbers denote the segment number.

The results obtained for the current density distribution and the respective locally resolved impedance spectrum for low humidity $H_2/O_2$ operation of our segmented PEFC are shown in FIG. 7. In the experiments described here both gases were fed to the gas inlets at the top of the cell and passed along the gas channels in co-flow mode (FIG. 7a).

The benefit of an increasing relative humidity due to the formation of product water along the gas channels is clearly demonstrated. As the humidity increases along the channels from segment 9 to segment 1 due to cumulative utilization of oxygen, the current density increases in principle in the same direction (FIG. 7a). Starting from the gas inlets at first the current density slightly increases from segment 9 to segment 6 ("low current density region") followed by a strong increase in current density (segments 6-4) until a plateau at high current densities of around 850 mA/cm$^2$ is reached (segments 1 to 4). In this plateau region ("high current density region") the current density passes a small maximum, i.e. the current density slightly decreases towards the gas outlets.

Figure 7B:
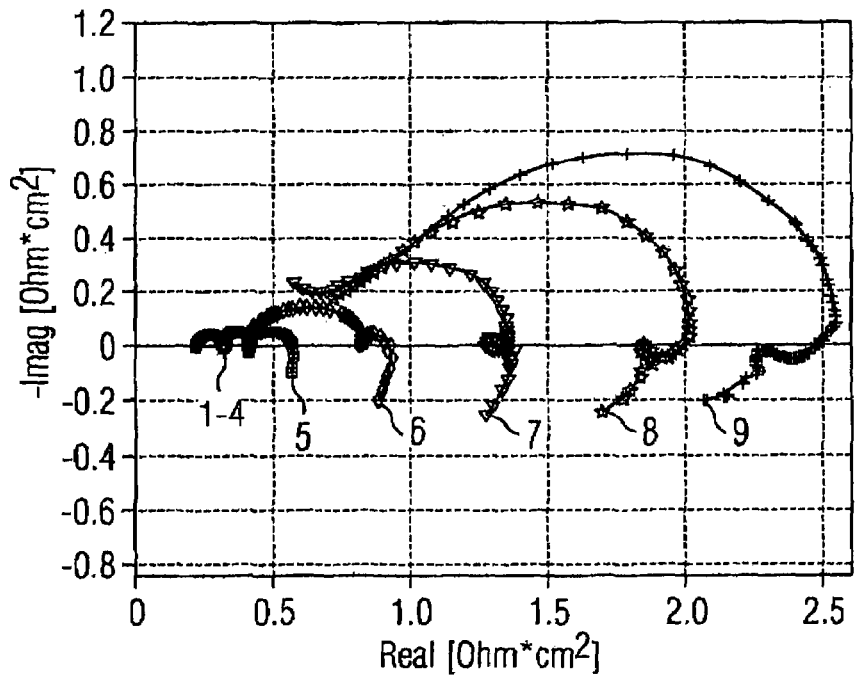

As the current density increases along the channels the shape of the local impedance spectrum changes dramatically, i.e. the effect of processes limiting cell performance change along the channel (FIG. 7b).

Figure 7C:
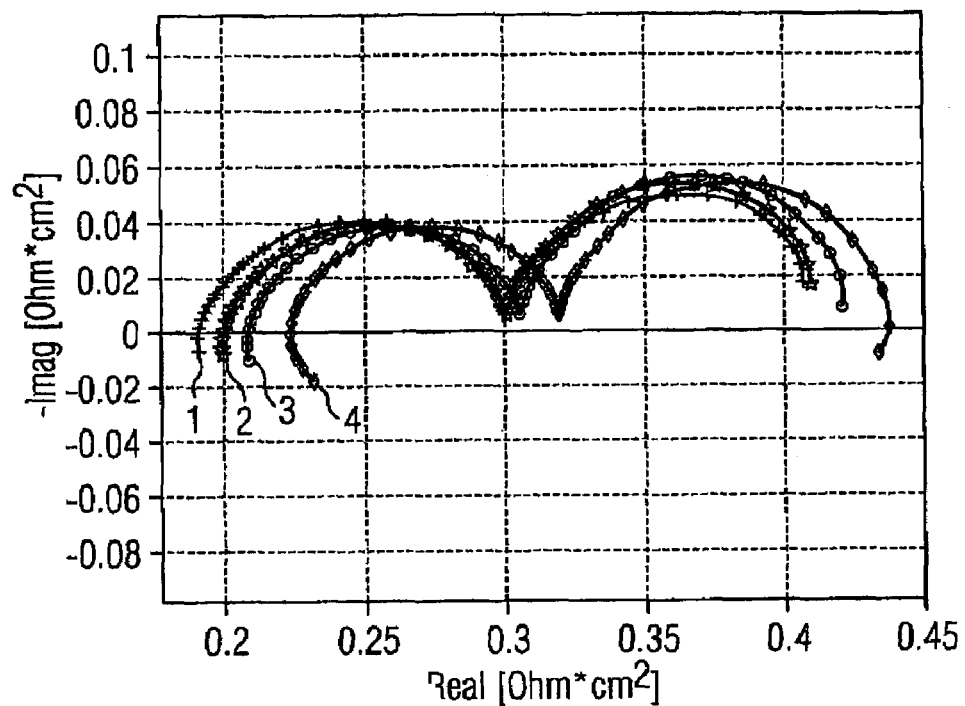

The impedance spectra of segments 1 to 4 (high current density region) are all similar in shape (FIG. 7c). All spectra show one high frequency and a second low frequency capacitive arc. However, the ohmic resistance taken from the high frequency intercept with the real axis clearly increases along the channels from segment 1 to segment 4, clearly demonstrating the increasing membrane resistance with decreasing humidity, whereas the real axis intercept of the higher frequency arc decreases in size with decreasing humidity.

If one attributes the real axis intercept of the higher frequency loop to the charge transfer resistance the increasing size of the real axis intercept with increasing humidity from segment 4 to segment 1 might be due to cumulative blocking of active sites due to formation of liquid water. Since the ohmic resistance decreases with increasing humidity, i.e. in opposite direction to the increasing charge transfer resistance, this could explain the slight maximum in current density observed in the high current region.

However, with further decreasing humidity and current density along the gas channels towards the gas inlets from segment 4 to segment 9 a strong increase in ohmic and charge transfer resistance is observed in the local impedance spectra.

Furthermore, an additional high frequency loop becomes apparent in the spectra of segments 5 to 9. In the spectra of segments 7 to 9 the high frequency loop is still not closed at modulation frequencies of 10 kHz.

In this embodiment, the measurement setup is limited to modulation frequencies up to 10 kHz. The high frequency real axis intercept in the impedance spectra of segments 7 to 9, i.e. the ohmic resistance of these segments, could only be estimated. For these segments, the real part at a modulation frequency of 10 kHz was used to calculate an upper limit for the ohmic voltage drop $\Delta U_{IR}$ in a segment. Due to a decreasing ohmic voltage drop $\Delta U_{IR}$ along the channels from segment 5 to segment 9 and thus an increasing overall polarisation of the electrode in the same direction (FIG. 7a) the increase in charge transfer resistance from segment 5 to segment 9 can only be due to drying of the catalyst layers and by this loss of active area. The increasing ohmic resistance along the gas channels can be attributed to drying of the membrane with decreasing humidity.

In the low frequency range of the local impedance spectra of segments 5 to 9 an inductive behaviour occurs, whereas the capacitive low frequency arc withers. This capacitive arc has disappeared in the local impedance spectrum of segment 9, but two inductive loops are here clearly apparent. This evolution of the local impedance spectrum along the gas channels can be understood in a first approach by taking into account results obtained for the anode and cathode spectrum by using a so called 1-dimensional PEFC operated on pure $H_2/O_2$. For this, a pseudo reference electrode incorporated into the polymer electrolyte has been used. The anode spectrum is showing three capacitive arcs and has been modelled starting from kinetic equations. The high frequency arc can be attributed to hydrogen charge transfer kinetics and the double layer capacity, the middle frequency arc to hydrogen adsorption and desorption and the low frequency arc to finite diffusion including water transport in the aqueous phase within the polymer morphology.

The cathode spectrum shows one high frequency capacitive arc and an inductive low frequency arc. The impedance spectrum of the oxygen reduction reaction on platinum nanoparticles in Nafion in a gas diffusion electrode with thin active layer has been modelled assuming an ECE mechanism with two adsorbed intermediate species. According to this model the capacitive loop can be attributed to the charge transfer resistance/double layer capacity and relaxation of one of the two adsorbed intermediate species. The low frequency inductive loop is explained by the second relaxation of the adsorbed intermediate species.

In the measurements employing a pseudo reference electrode the low frequency capacitive loop of the anode spectrum and the inductive loop of the cathode spectrum appear in a similar frequency range. The low frequency capacitive arc of the anode spectrum increases in size with increasing current density whereas the low frequency inductive arc of the cathode spectrum decreases, i.e. at high current densities the capacitive low frequency arc of the anode spectrum masks the inductive behaviour of the cathode. So there is a competition between the low frequency inductive arc of the cathode and the low frequency capacitive arc of the anode in their contribution to the overall impedance spectrum of the cell.

According to these results two kinetic regimes in the cell can be observed. At high current densities and high humidity (segments 1 to 4) the ORR kinetics and the diffusion at the anode are rate limiting (FIG. 7c). At low current densities and low humidity (segments 6 to 9) the diffusion is less or rather not important, since the capacitive arc in the lower frequency range disappears and the inductive behaviour of the cathode becomes dominating (FIG. 7b). Here the ORR and, due to the formation of a third higher frequency arc, possibly even more the HOR are strongly limiting due to drying of the catalyst layers. The ohmic and especially the charge transfer resistance increase dramatically along the channel length with decreasing humidity due to drying of the membrane and the catalyst layers (FIG. 7b). However, two inductive loops are present in the spectrum of segment 9 and it is unclear, whether the lower frequency part of this spectrum can exclusively be attributed to the cathode, or whether the lower frequency part of this spectrum is still influenced by the low frequency capacitive behaviour of the anode spectrum.

Figure 8A:
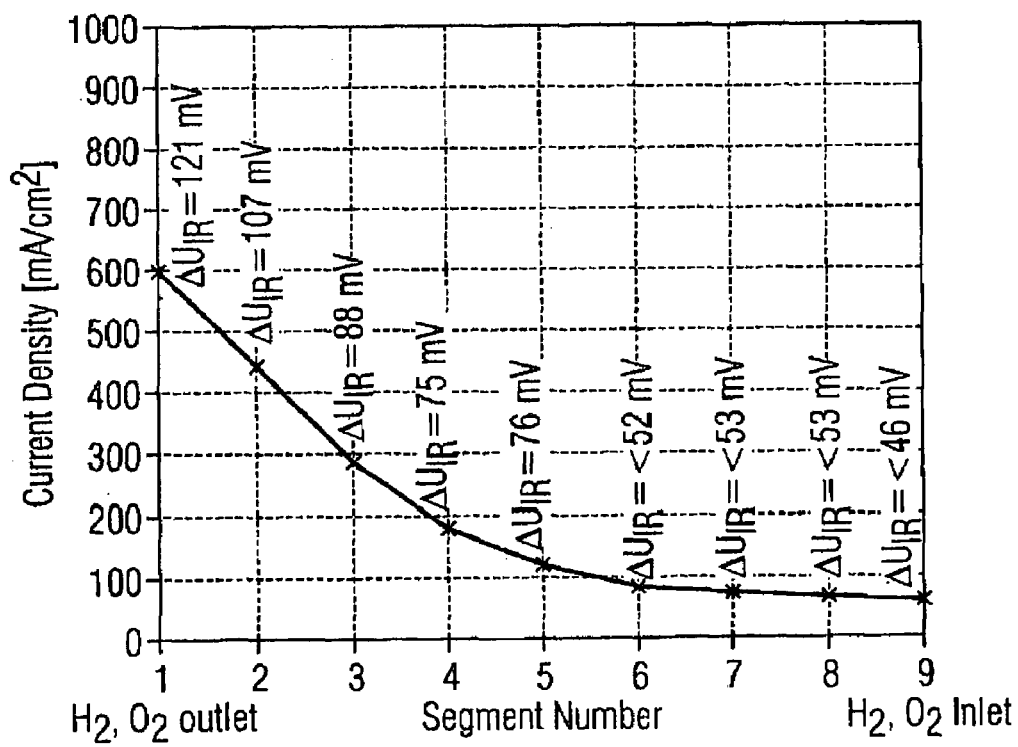
FIG. 8 a) a current density distribution curve and ohmic voltage drop $\Delta U_{IR}$, b) locally resolved impedance spectrum (segments 1 to 9), c) locally resolved impedance spectrum (segments 1 to 4) for $H_2/O_2$ operation of the PEFC, operating conditions: cell current $I_{Cell}$=5 A, stoichiometry $\lambda$=4.4, modulation frequency range f=10 mHz to 10 kHz, cell voltage $U_{Cell}$=640 mV, numbers denote the segment number.
Figure 8B:
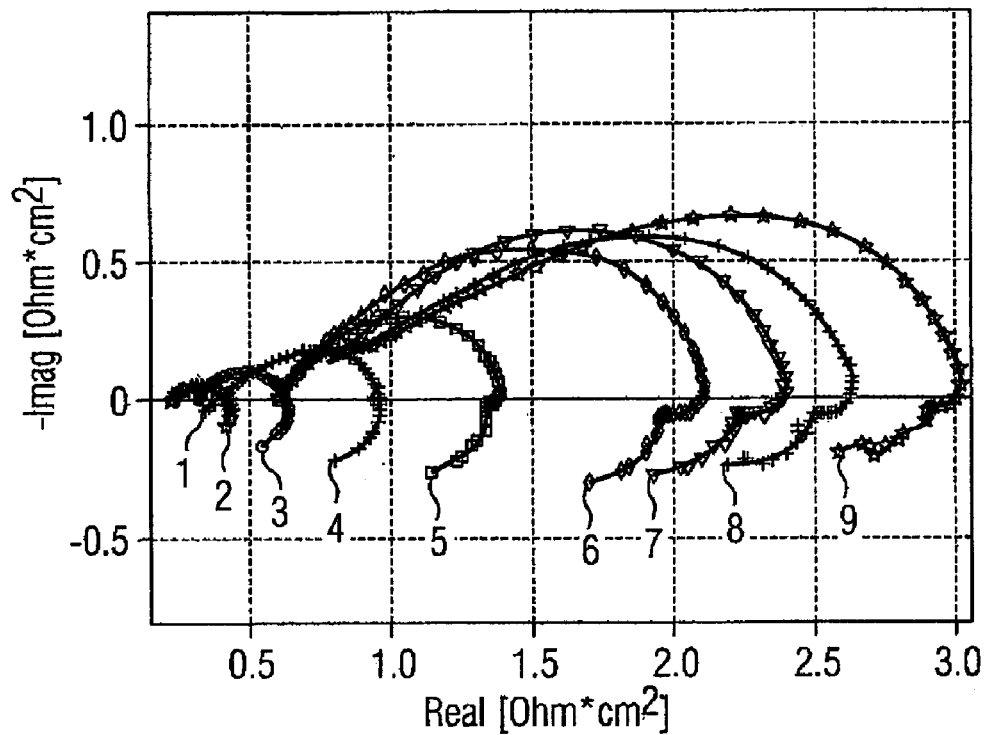
Figure 8C:
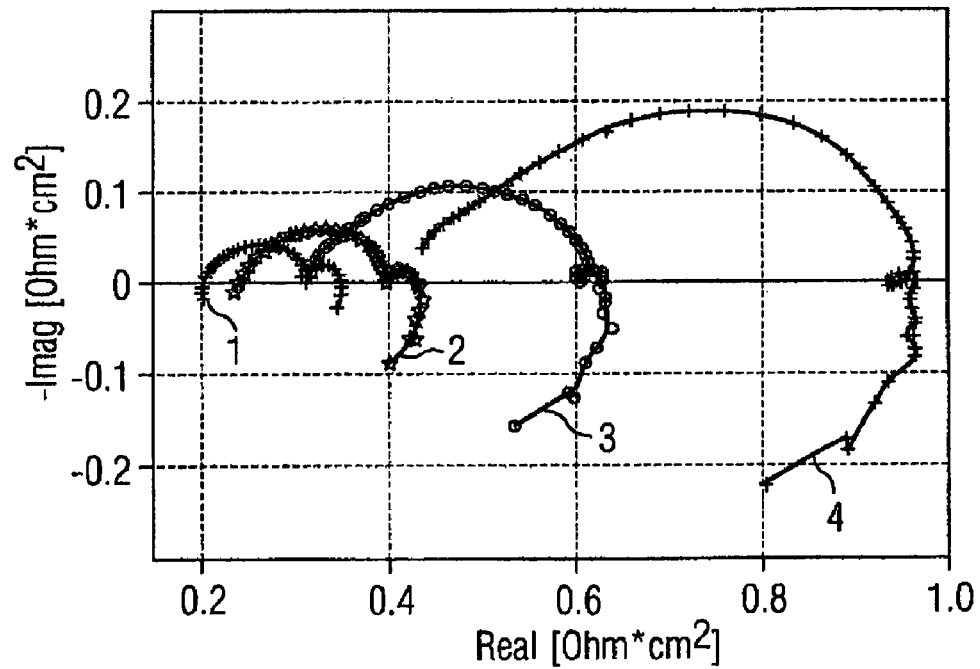
Figure 9:
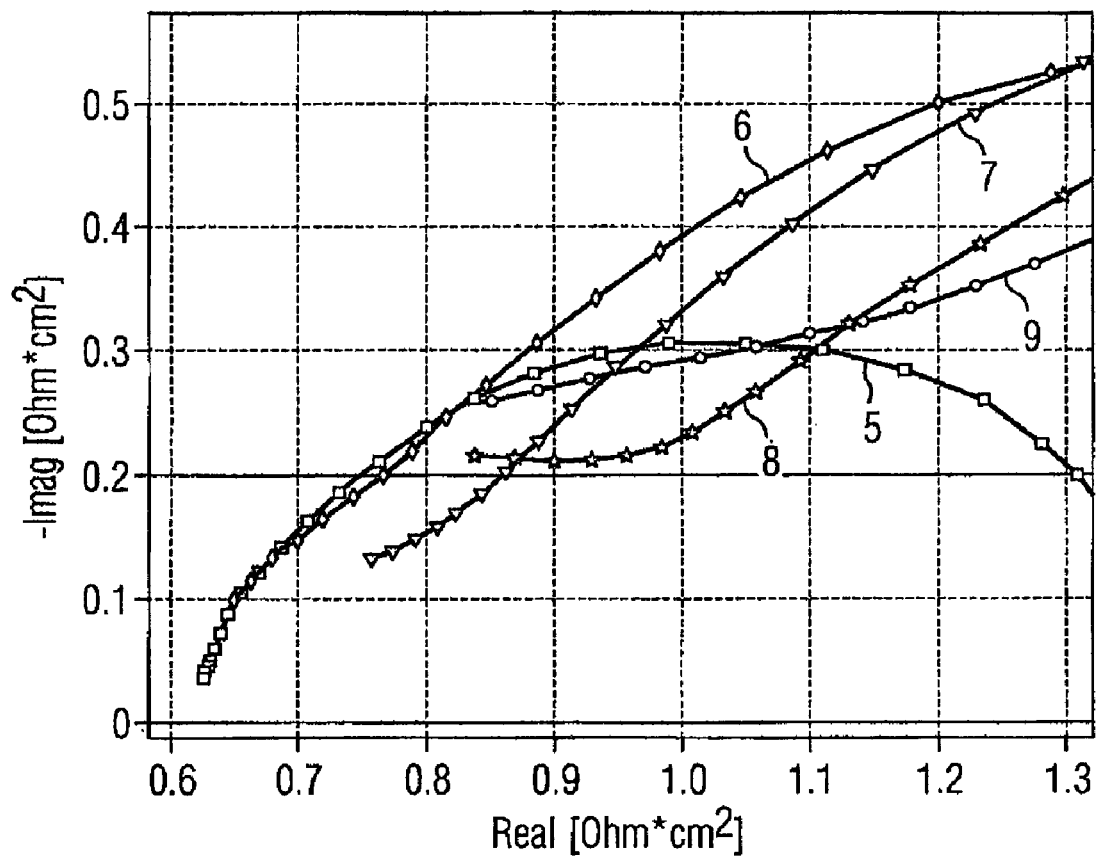
FIG. 9 a magnified representation of the high frequency range ($f_{max}$=10 kHz) of the local impedance spectra of segments 5 to 9 for H$_2$/O$_2$ operation of the cell at a cell current of I$_{Cell}$=5 A and a gas stoichiometry of λ=4.4, numbers denote the segment number.
Figure 10:
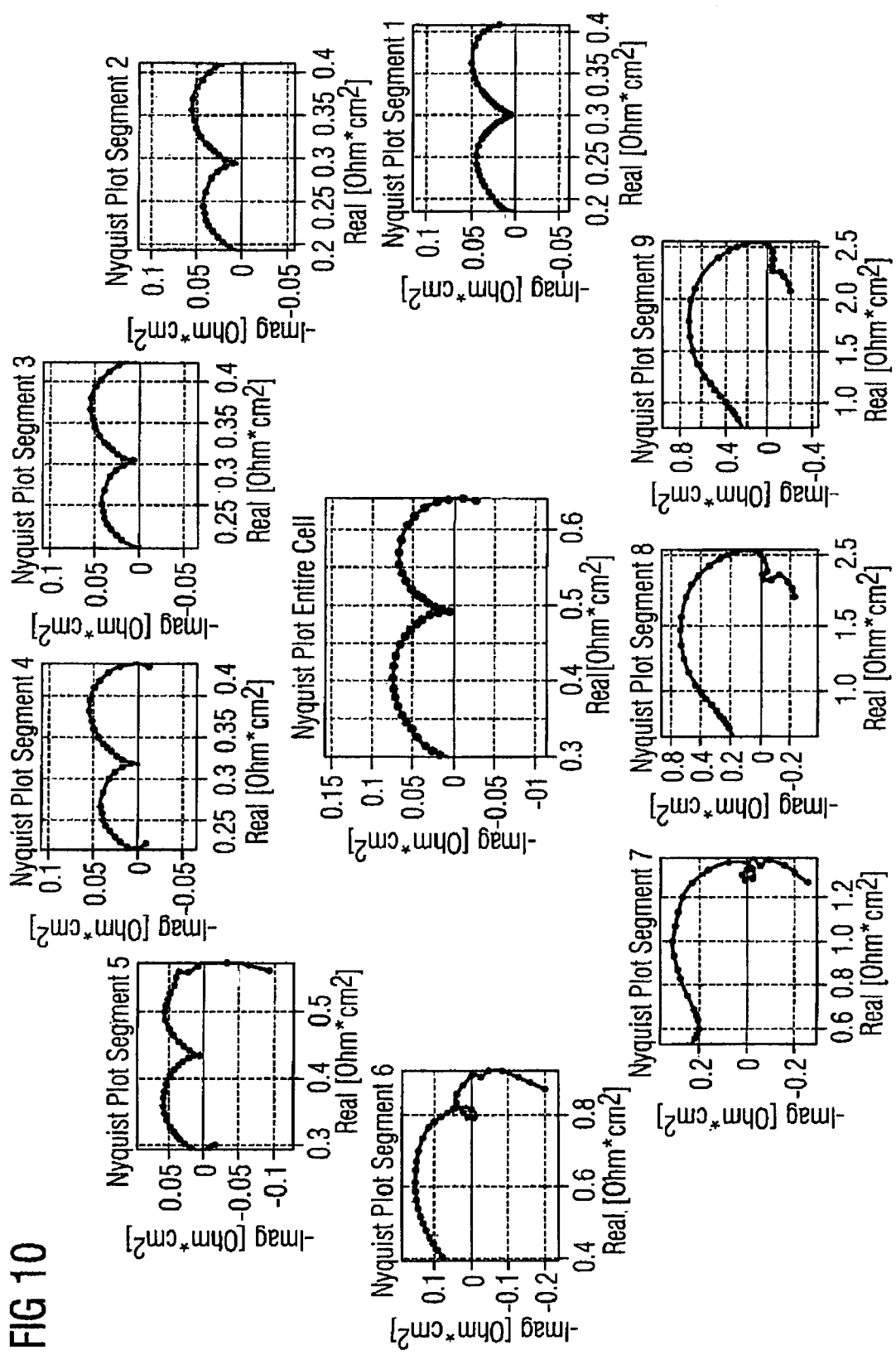
FIG. 10 an evolution of local impedance spectra along the gas channels from the gas outlets (segment 1) to the gas inlets (segment 9) and calculated spectra of the entire cell for H$_2$/O$_2$ operation, operating conditions: cell current I$_{Cell}$=14.6 A, gas stoichiometry λ=1.5, modulation frequency range f=15 mHz to 10 kHz, cell voltage U$_{Cell}$=538 mV, numbers denote the segment number.

To corroborate the results, the cell has been operated at a lower overall cell current of $I_{Cell}$=5 A keeping the gas flow rate constant, i.e. the cell was operated using a gas stoichiometry for $H_2$ and $O_2$ of $\lambda=4$, 4. The results are shown in FIG. 8. Again the current density increases along the channels with increasing humidity, but due to the higher gas stoichiometry and the lower cell current a plateau in current density is not reached anymore (FIG. 8a). Starting from the gas outlet (segment 1) the charge transfer resistance and in principle the ohmic resistance dramatically increase due to cumulative drying of the catalyst layers and the membrane along the channels (FIG. 8b, c). Even here the capacitive lower frequency arc withers with decreasing humidity and decreasing current density (FIG. 8c) and finally disappears (FIG. 8b), whereas two inductive loops in the low frequency range of the spectra and an additional high frequency capacitive loop become clearly apparent in the local impedance spectra of segments 5 to 9 (FIG. 8b). The formation of the higher frequency loop is clearly seen in FIG. 9, the formation of the loop becomes more pronounced with decreasing humidity, i.e. with increasing segment number. However, the extrapolated value of the high frequency intercept with the real axis is comparable for segment 5 and 6 and this seems to be also true for segment 7 to 9.

Figure 11A:
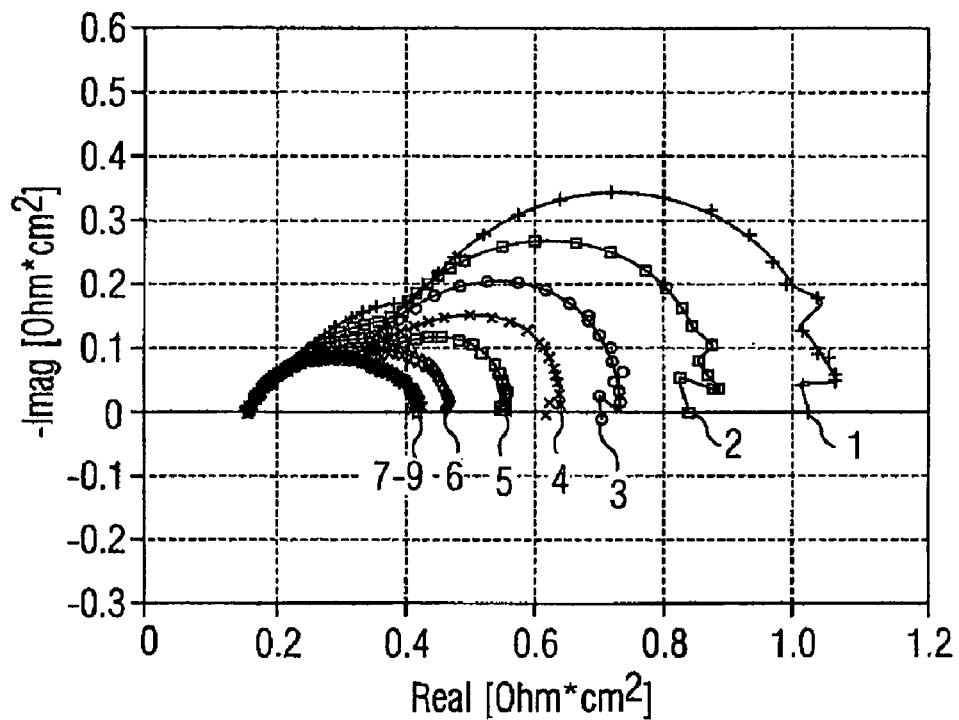
FIG. 11 a) to c) locally resolved impedance spectra for H$_2$/air operation of the PEFC at air stoichiometries of a) λ$_{air}$=2.0, b) λ$_{air}$=2.5 and c) λ$_{air}$=3.0, numbers denote the segment number, d) calculated spectra of the entire cell and average cell voltage at air stoichiometries of λ$_{air}$=2.0, λ$_{air}$=2.5 and λ$_{air}$=3.0, e) current density distribution curves at air stoichiometries of λ$_{air}$=2.0, λ$_{air}$=2.5 and λ$_{air}$=3.0, modulation frequency range f=100 mHz to 10 kHz.
Figure 11B:
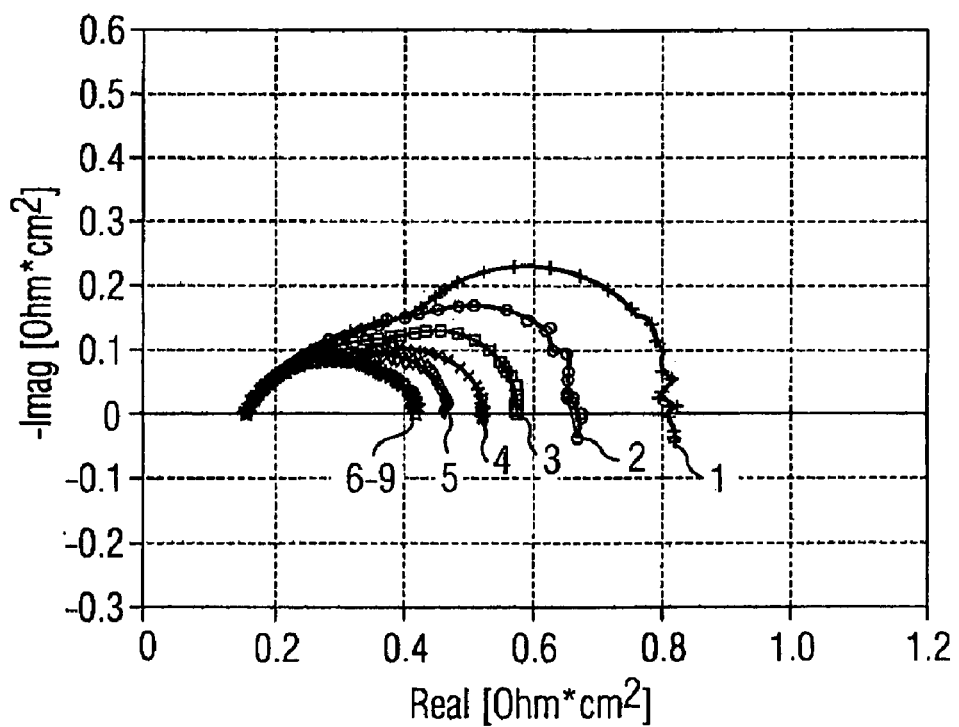

The results for $H_2$/air operation at different air stoichiometries are shown in FIG. 11. The higher frequency part of the spectrum has been attributed to processes occurring in the cathode catalyst layer, i.e. charge transfer, agglomerate and thin film diffusion. The lower frequency part of the spectrum has been assigned to mass transport limitations in the backing layer of the cathode. This model can be used to comment the spectra shown in FIGS. 11a to d in a first approach, excluding anode limitations.

Due to the fully humidified conditions applied here, the high frequency resistance, i.e. the ohmic resistance of the segments is virtually equal at a given air stoichiometry, though at higher air stoichiometry ($\lambda=3.0$) slight differences occur, probably due to imperfect humidification of the air at higher gas flow rates.

However, the most significant characteristic of the locally resolved impedance spectra is the increasing size of the low frequency loop as a function of channel length at a given air stoichiometry from the air inlet to the outlet, as oxygen is cumulative depleted and water is cumulative formed on the cathode side along the gas channels.

In the experiments the air stoichiometry has been varied. The corresponding locally resolved impedance spectra (FIGS. 11a to c) show that the increasing size of the low frequency loop along the channels becomes stronger pronounced with decreasing air stoichiometry $\lambda_{Air}$. This proves the assumption that the increase of the lower frequency arc along the channels can be attributed to an increasing gas phase mass transport limitation at the air cathode. This is likely due to cumulative flooding of the GDL and a decreasing molar fraction of oxygen in the cathodic gas stream, since the increase of the lower frequency loop becomes more pronounced with decreasing air stoichiometry. Detailed investigations could prove these assumptions by using a combination of fast locally resolved EIS and neutron imaging of water. However, the respective calculated impedance spectra of the entire cell are only little affected by the air stoichiometry (FIG. 11d).

The system for performing fast parallel locally resolved electrochemical impedance spectroscopy has been proven to be a powerful in situ diagnostic tool for PEFCs. The high performance of the system due to our unique fast parallel approach and the high quality of the local impedance measurement has been demonstrated in a large frequency range from 10 kHz down to low frequencies of 10 mHz. For the first time parallel locally resolved EIS has been performed in a realistic PEFC operated on pure $H_2/O_2$ and $H_2$/Air.

The results show large differences in the local cell impedance spectra, i.e. regional distinctions in the processes limiting local cell performance do occur. For low humidity $H_2/O_2$ operation of the cell the locally resolved impedance spectra clearly show that the performance loss along the serpentine flow-field channels can be attributed to drying effects. Furthermore, with decreasing humidity an inductive behaviour is observed in the low frequency range of the spectra. For $H_2$/Air operation an increasing size of the lower frequency loop of the local impedance spectra along the channels from the air inlet to the outlet has been observed. This effect becomes stronger pronounced with decreasing air stoichiometry and thus is likely due to cumulative flooding of the GDL and a decreasing molar fraction of oxygen in the cathodic gas stream along the channels.

The combination of locally resolved current density measurements and locally resolved electrochemical impedance spectroscopy is a powerful tool for in situ diagnostics in PEFCs which allows the identification and particularly the explanation of local inhomogeneities in the performance of a PEFC.

The invention claimed is:

1. A polymer electrolyte fuel cell comprising:
an anode reactant supply plate;
an anode current collector;
an anode gas diffusion layer;
a cathode reactant supply plate;
a cathode current collector;
a cathode gas diffusion layer;
a polymer membrane electrode assembly (MEA) sandwiched between the anode gas diffusion layer and the cathode gas diffusion layer;
at least one of the anode current collector and the cathode current collector being electrically separated into a number of segments, each of the at least one segmented current collectors including a gold plated copper plate, each segment of at least a subgroup of segments being separately connected to an electronic drive and analysis circuitry which performs in parallel impedance measurements in a frequency range of 0.1 mHz to 50 kHz of the respective segments;
the electronic drive and analysis circuitry including for each segment of the at least one segmented current collector a closed-loop Hall effect current sensor circuit mounted on a printed circuit board directly connected to a current drain of the at least one segmented current collector in order to produce a segment specific ac voltage output proportional to the ac current in the respective segment;
said electronic drive and analysis circuitry further including an electronic load common to all segments, to control the overall cell current; and
said electronic load being adjustable in the range up to 1000 A.

2. The fuel cell according to claim 1, wherein the segments are formed as rows.

3. The fuel cell according to claim 1, wherein the electronic drive and analysis circuitry detects a segment specific voltage and current output simultaneously for at least a subgroup of the number of segments.

4. The fuel cell according to claim 1, wherein the electronic drive and analysis circuitry detects a segment specific voltage and current output at a sample frequency in a range of 1 mHz to 10 MHz, whereas sampled signals are used for spectrum analysis.

5. The fuel cell according to claim 1, wherein the electronic drive and analysis circuitry comprises a multichannel potentiostat to control the voltage of the segments; said voltage being adjustable in a range from 0 V up to 2 V.

6. The fuel cell according to claim 1, wherein the electronic drive and analysis circuitry comprises an AC generator charging an impedance measurement circuit with AC signals in a range from 0.1 mHz to 50 kHz.

7. A method for determining an operational status of a polymer electrolyte fuel cell including an anode reactant supply plate, an anode current collector, an anode gas diffusion layer, a cathode reactant supply plate, a cathode current collector, a cathode gas layer and a polymer membrane electrode assembly (MEA) sandwiched between the anode gas diffusion layer and the cathode gas diffusion layer, said method comprising the steps of:
   a) separating electrically one of the anode current collector and the cathode current collector into a number of segments, the segmentation of the segmented current collector following the path of the gas channels in the respective reactant supply plate, and each segmented current collector including a gold plated copper plate;
   b) connecting each segment of at least a selectable subgroup of segments separately to an electronic drive and analysis circuitry, the electronic drive and analysis circuitry including for each segment of the segmented current collector a closed-loop Hall effect current sensor circuit mounted on a printed circuit board directly connected to a current drain of the current collector, the electronic drive and analysis circuitry additionally including an electronic load common to all segments, to control the overall cell current, the electronic load being adjustable in the range up to 1000 A;
   c) performing in parallel an impedance measurement in a frequency range of 0.1 mHz to 50 kHz for the respective segments and determining an impedance spectra for each of the respective segments; and
   d) determining an operational status of the fuel cell in dependency of the determined impedance spectra.

8. The method according to claim 7, wherein the segments are formed as rows.

9. The method according to claim 7, further comprising the step of detecting a segment specific voltage and current output simultaneously for at least a subgroup of the number of segments by the electronic drive and analysis circuitry.

10. The method according to claim 7, further comprising the step of detecting a segment specific voltage and current output at a sample frequency in a range of 1 mHz to 10 MHz, whereas the sampled signals are used for spectrum analysis by the electronic drive and analysis circuitry.

11. The method according to claim 7, further comprising providing a multichannel potentiostat with the electronic drive and analysis circuitry for controlling a voltage of the segments; said voltage being adjustable in a range from 0 V up to 2 V.

12. The method according to claim 7, further comprising the steps of providing an AC generator with the electronic drive and analysis circuitry and charging an impedance measurement circuit with AC signals in a range from 0.1 mHz to 50 kHz by an ac generator.

* * * * *